US012238595B2

(12) United States Patent
Saini et al.

(10) Patent No.: US 12,238,595 B2
(45) Date of Patent: *Feb. 25, 2025

(54) ULTRA RELIABLE REPORTING OF SCG MEASUREMENTS WHILE SpCELL DEGRADES

(71) Applicant: APPLE INC., Cupertino, CA (US)

(72) Inventors: Kulwinder Saini, Bavaria-Bayern (DE); Vijayant Kumar, Munich (DE)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,495

(22) Filed: Jun. 5, 2024

(65) Prior Publication Data

US 2024/0406814 A1 Dec. 5, 2024

Related U.S. Application Data

(63) Continuation of application No. 17/224,377, filed on Apr. 7, 2021, now Pat. No. 12,047,821.

(51) Int. Cl.
*H04W 36/00* (2009.01)

(52) U.S. Cl.
CPC ... *H04W 36/0069* (2018.08); *H04W 36/0022* (2013.01); *H04W 36/00222* (2023.05);
(Continued)

(58) Field of Classification Search
CPC ......... H04W 36/0016; H04W 36/0022; H04W 36/0058; H04W 36/0069; H04W 36/0083;
(Continued)

(56) References Cited

U.S. PATENT DOCUMENTS

| 11,399,296 B2 | 7/2022 | Martin et al. |
| 2016/0219604 A1 | 7/2016 | Fujishiro et al. |
| 2020/0107236 A1 | 4/2020 | Tseng et al. |
| 2020/0107390 A1 | 4/2020 | Hwang et al. |
| 2020/0169906 A1 | 5/2020 | Tsuboi et al. |

(Continued)

FOREIGN PATENT DOCUMENTS

| CN | 110839301 A | 2/2020 |
| CN | 111066338 A | 4/2020 |

(Continued)

OTHER PUBLICATIONS

U.S. Appl. No. 17/224,377, Non-Final Office Action, Aug. 3, 2022, 13 pages.

(Continued)

*Primary Examiner* — Matthew W Genack
(74) *Attorney, Agent, or Firm* — Dorsey & Whitney LLP

(57) ABSTRACT

Systems and methods for ultra reliable reporting of secondary cell group (SCG) measurements to a secondary node (SN) used in multi-radio dual connectivity (MR-DC) operation that specifically account for the possibility of SCG special cell (SpCell) degradation are disclosed herein. A user equipment (UE) may establish a signaling radio bearer (SRB) 3 with the SN. The UE may then identify that a handover condition (which may be associated with SCG SpCell degradation) for the SCG SpCell is met, and accordingly send an SCG measurement report over each of the SRB3 and an SRB1 between the UE and a master node (MN) used in the MR-DC operation. Such information received at the MN is forwarded to the SN. Accordingly, the reception of SCG measurement reports (to enable handover to a new SpCell by the SN) is not solely dependent messages on the SpCell of the SCG alone (using SRB3), improving reliability.

20 Claims, 15 Drawing Sheets

(52) U.S. Cl.
CPC . *H04W 36/0058* (2018.08); *H04W 36/00837* (2018.08); *H04W 36/0085* (2018.08); *H04W 36/00698* (2023.05)

(58) Field of Classification Search
CPC ....... H04W 36/00837; H04W 36/0085; H04W 36/0088; H04W 36/0094
See application file for complete search history.

(56) References Cited

U.S. PATENT DOCUMENTS

| | | |
|---|---|---|
| 2020/0252822 A1 | 8/2020 | Kim et al. |
| 2020/0275503 A1 | 8/2020 | Yang et al. |
| 2020/0351792 A1 | 11/2020 | Ghelichi et al. |
| 2021/0105058 A1 | 4/2021 | Lin |
| 2021/0136638 A1 | 5/2021 | Paladugu et al. |
| 2021/0168690 A1 | 6/2021 | Zheng et al. |
| 2021/0377827 A1 | 12/2021 | Yao et al. |
| 2023/0300654 A1 | 9/2023 | Da Silva et al. |

FOREIGN PATENT DOCUMENTS

| | | |
|---|---|---|
| EP | 3714630 A1 | 9/2020 |
| WO | 2018203710 A1 | 11/2018 |
| WO | 2020132427 A1 | 6/2020 |
| WO | 2020162704 A1 | 8/2020 |
| WO | 2021027876 A1 | 2/2021 |

OTHER PUBLICATIONS

U.S. Appl. No. 17/224,377, Final Office Action, Feb. 6, 2023, 15 pages.
U.S. Appl. No. 17/224,377, Non-Final Office Action, May 18, 2023, 15 pages.
U.S. Appl. No. 17/224,377, Final Office Action, Nov. 20, 2023, 9 pages.
U.S. Appl. No. 17/812,047, Non-Final Office Action, Apr. 26, 2023, 16 pages.
U.S. Appl. No. 17/812,047, Final Office Action, Oct. 27, 2023, 19 pages.
U.S. Appl. No. 17/224,377, Notice of Allowance, May 6, 2024, 8 pages.
3GPP TS 37.340, "3rd Generation Partnership Project; Technical Specification Group Radio Access Network; Evolved Universal Terrestrial Radio Access (E-UTRA) and NR; Multi-connectivity; Stage 2 (Release 16)", V16.5.0, Mar. 2021, 84 pages.
Ericsson, "Consequences of handover without key change on SRB PDCP", Tdoc R2-1711352, 3GPP TSG-RAN WG2 #99, Prague, Czech Republic, Agenda Item 10.2.6, Oct. 9-13, 2017, 3 pages.

ULTRA RELIABLE REPORTING OF SCG MEASUREMENTS WHILE SpCELL DEGRADES

TECHNICAL FIELD

This application relates generally to wireless communication systems, including systems and methods for ultra reliable reporting of secondary cell group (SCG) measurements when using multi-radio dual connectivity (MR-DC).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In this disclosure, RAN nodes of LTE systems may sometimes be referred to as LTE nodes. In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Multi-radio dual connectivity (MR-DC) is a generalization of Intra-E-UTRA dual connectivity (DC), where a multiple Rx/Tx capable UE may be configured to utilize resources provided by two different nodes, one providing NR access and the other one providing either E-UTRA (LTE) or NR access. One node may act as a master node (MN) and the other may act as a secondary node (SN). The MN and SN may be connected via a network interface, and at least the MN is connected to the core network. The MN and/or the SN may be operated with shared spectrum channel access.

The UE can access the network using either one network node or using two different nodes with various MR-DC modes. Examples of possible MR-DC modes include an E-UTRA-NR dual connectivity (EN-DC) mode and NR-NR dual connectivity (NR-DC) mode. In these MR-DC modes, the UE may communicate with the MN using one or more cells of a master cell group (MCG) that is available/provided by the MN, and the UE may communicate with the SR using one or more cells of a secondary cell group (SCG) that is provided by the SN. Each of the MCG and the SCG communicate with the UE using respectively one or more cells that includes at least a respective special cell (SpCell), with the SpCell of the MCG being referred to sometimes as a PCell and the SpCell of the SCG being referred to sometimes as a PSCell.

Figure 1:
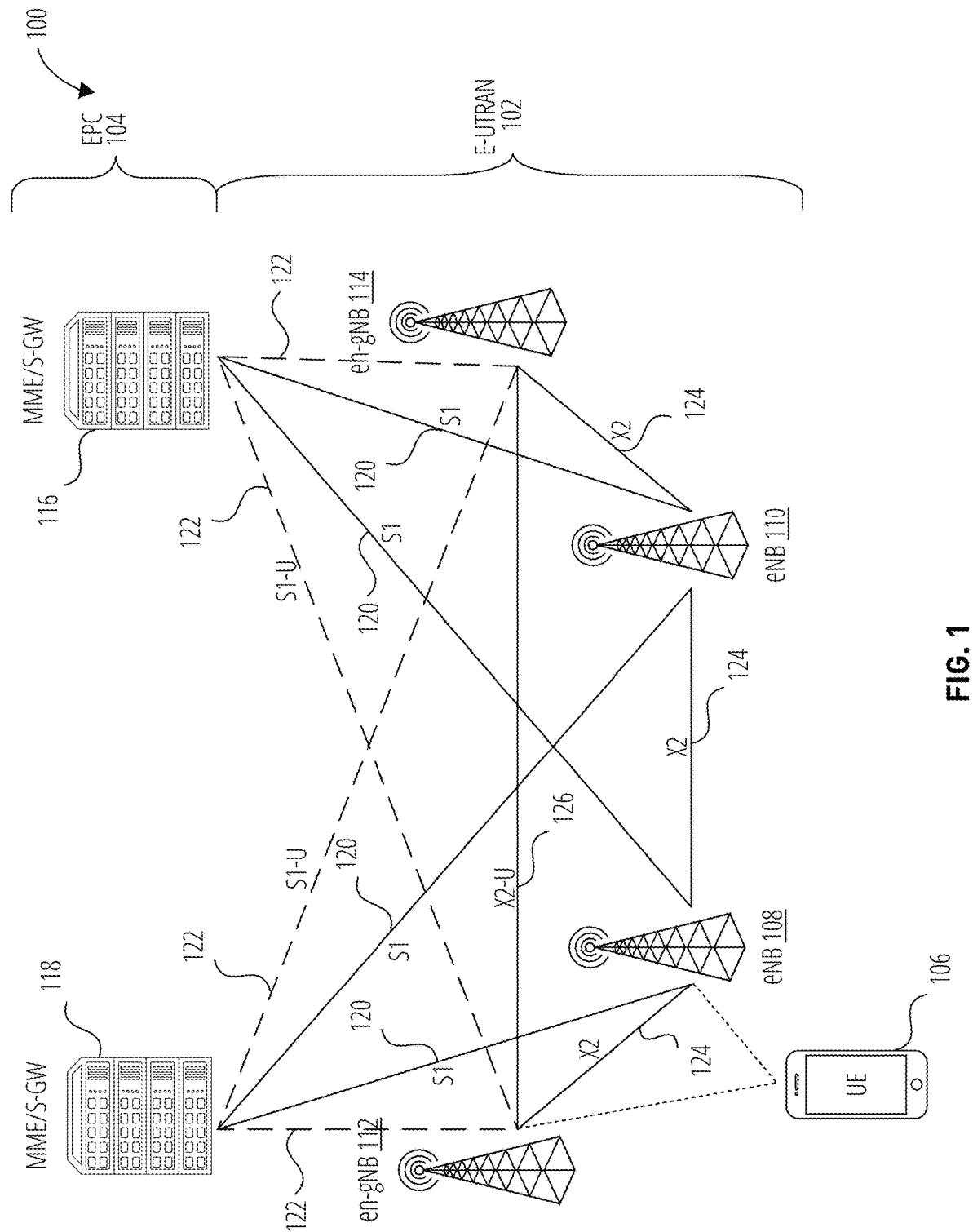
FIG. 1 illustrates an EN-DC architecture according to embodiments herein.

FIG. 1 illustrates an EN-DC architecture 100 according to embodiments herein. The EN-DC architecture 100 includes an E-UTRAN 102 and an EPC 104. The E-UTRAN 102 supports MR-DC via EN-DC, in which a UE (in FIG. 1, the UE 106) is connected to one eNB that acts as a MN (in FIG. 1, the eNB 108) and one en-gNB (in FIG. 1, the en-gNB 112) that acts as a SN. An en-gNB such as the en-gNB 112 may be a node that provides NR user plane and control plane protocol terminations towards the UE 106, and may act as a SN in EN-DC. In FIG. 1, the EPC 104 may comprise one or more Mobility Management Entity/Serving Gateways (MME/S-GWs), such as an MME/S-GW 118 and an MME/S-GW 116. By way of example, the E-UTRAN 102 may comprise the eNB 108, an eNB 110, the en-gNB 112, and an en-gNB 114. Each of the CNB 108 and the eNB 110 may be connected to the EPC 104 via one or more S1 interfaces 120 and to one or more en-gNBs via one or more X2 interfaces 124. Each of the en-gNB 112 and the en-gNB 114 may be connected to the EPC 104 via one or more S1-U interfaces 122. The en-gNB 112 and the en-gNB 114 may be connected to one another through an X2-U interface 126.

Figure 2:
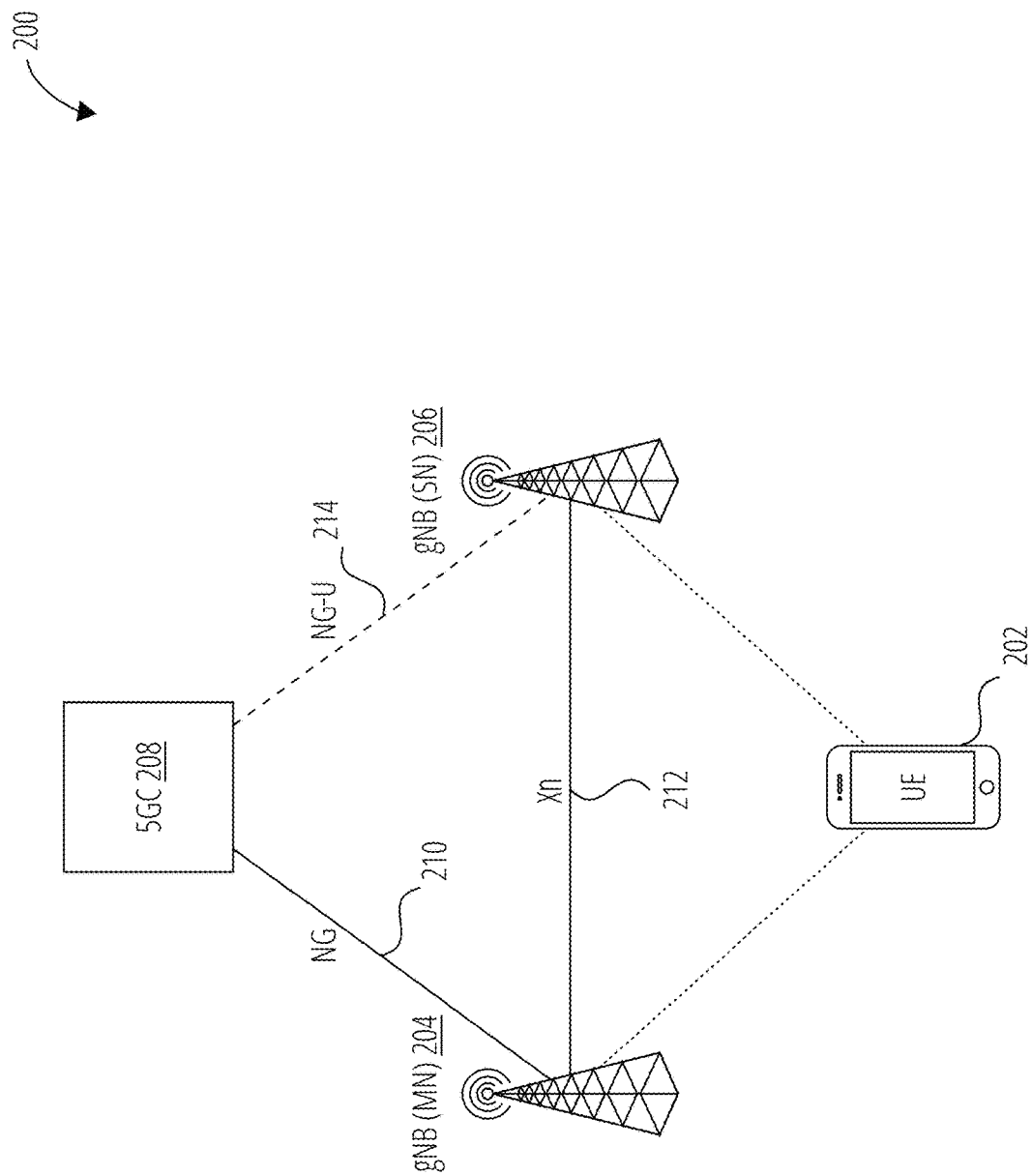
FIG. 2 illustrates an NR-DC architecture according to embodiments herein.

FIG. 2 illustrates an NR-DC architecture 200 according to embodiments herein. By way of example, the NR-DC architecture 200 of FIG. 2 illustrates a UE 202, a gNB (MN) 204, a gNB (SN) 206, and the 5G core network (5GC) 208. In NR-DC, a UE 202 is connected to a first gNB (MN) 204 that acts as an MN and a second gNB (SN) 206 that acts as an SN. The gNB (MN) 204 is connected to the 5GC 208 via an NG interface 210, and connected to the gNB (SN) 206 via an Xn interface 212. Further, the gNB (SN) 206 may be connected to the 5GC 208 via an NG-U interface 214 in some embodiments.

Signaling data attendant to the use of MR-DC may be carried using one or more signaling radio bearers (SRBs) from the UE to one of MN or the SN. An SRB may be used during connection establishment to establish radio access bearers (RABs), and may then further be used to deliver signaling while the UE is on the connection. That signaling may be related to the management of the connection. For example, SRBs may further be used to perform a handover, perform and/or report measurements, handle a reconfiguration or a release, etc.

An SRB1 may be configured for use between the UE and the MN. SRB1 may be used for radio resource control (RRC) messages (including piggybacked non-access stratum (NAS) messages) as well as for NAS messages prior to the establishment of an SRB2. This signaling may occur using a dedicated control channel (DCCH).

An SRB2 may be configured for use between the UE and the MN. SRB2 may be used for RRC messages which include logged measurement information. This signaling may occur using a DCCH. Note that SRB2 has a lower priority than SRB1, and may be configured by the network after an access stratum (AS) security activation has occurred.

An SRB3 may be configured for use between the UE and the SN. SRB3 may be used for specific RRC messages when the UE is in an EN-DC or an NR-DC mode, and may use a DCCH. In cases involving EN-DC and NR-DC to be discussed herein, SRB3 can be used, for example, for measurement configuration and reporting; for UE assistance (re) configuration and reporting for power savings; to (re) configure medium access control (MAC), radio link control (RLC), physical layer, and radio link failure (RLF) timers and constants of an SCG configuration; to reconfigure packet data convergence protocol (PDCP) for data radio bearers (DRBs) associated with the SN key (S-KgNB) or SRB3; to reconfigure service data adaptation protocol (SDAP) for DRBs associated with S-KgNB in EN-DC and NR-DC; and to add/modify/release conditional SpCell of a SCG (PSCell) change configurations, provided that the (re) configuration does not require any MN involvement. In EN-DC and NR-DC, each of measConfig, radioBearerConfig, conditionalReconfiguration, otherConfig, and/or secondaryCellGroup may be included in an RRCReconfiguration sent/received via SRB3.

In some embodiments of wireless communications systems using MR-DC (e.g., using EN-DC or NR-DC), it may be that while the UE is operating in the MR-DC mode with SRB3 configured, the UE sends any SCG measurement reports on the SRB3. For example, the UE may be utilizing a SCG of the SN by communicating on (at least) the SpCell of the SCG (where the SCG may be made of the SpCell and zero or more additional cells, which the UE may also be using for sending/receiving data to/from the SN). These SCG measurement reports may allow the SN to react (e.g., perform a handover of the UE to another SpCell of a target node) to changing SCG cell conditions. It may be that, for example, a standard for a wireless communication system defines some or all this behavior at the UE and/or SN.

Such measurement reports may be configured to be sent on the SpCell of the SCG. Accordingly, when the SpCell of the SCG begins to degrade, the probability of such an SCG measurement report on SRB3 being received at the SN also reduces. If the SCG measurement report reflecting the degradation is not received at the SN, then the SN may not appropriately react (e.g., perform handover to another SpCell) to the degrading nature of the SpCell (because it remains uninformed of the degradation). This may result in SCG failure from the point of view of the UE (e.g., an RLF with the SpCell of the SCG), potentially leading to the disruption of any services to the UE that were being provided to the UE through the SN.

Figure 3:
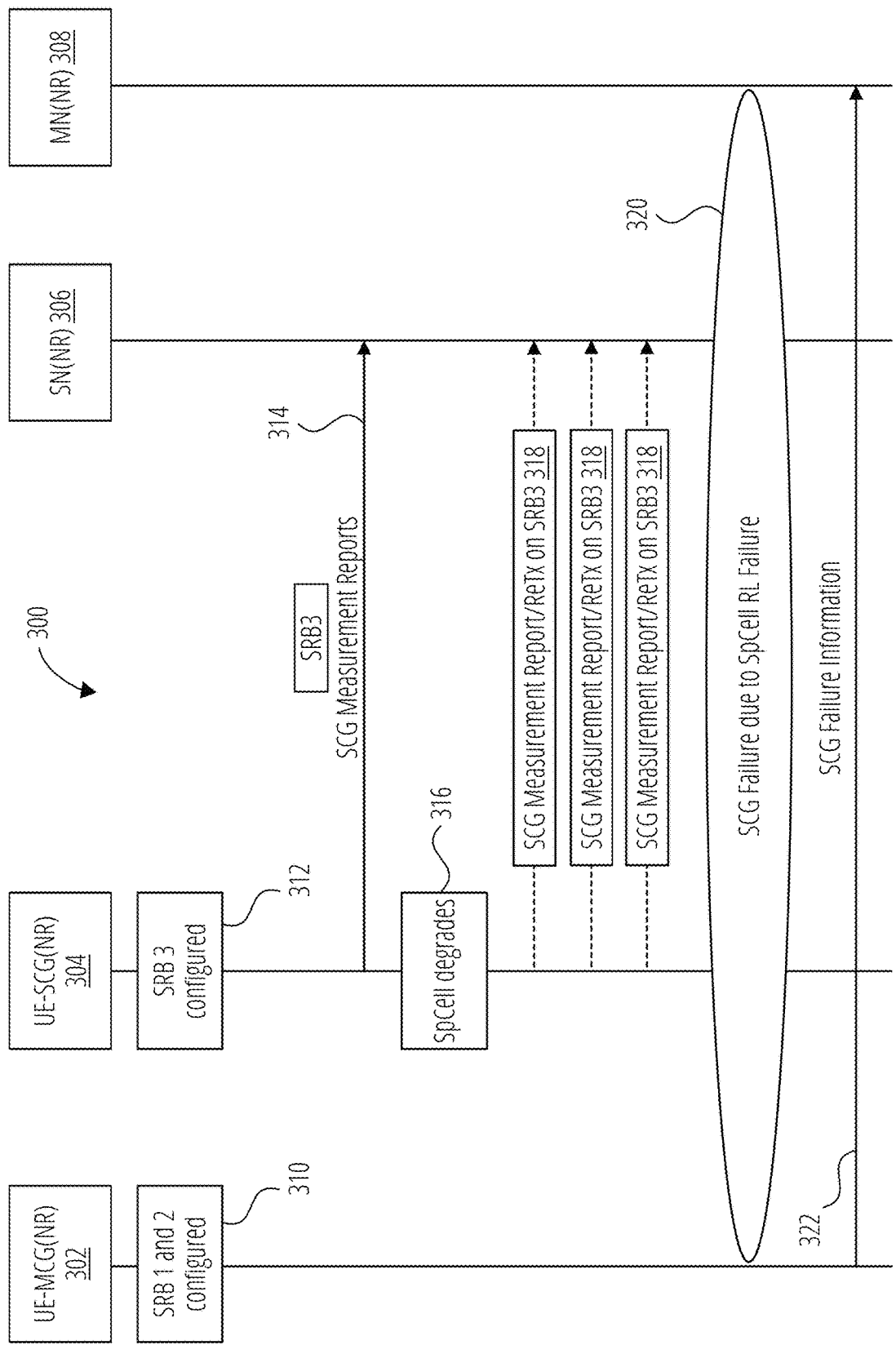
FIG. 3 illustrates a flow diagram of a failure of SCG measurement reports from a UE to reach an SN on SRB3 because of SCG SpCell degradation when the UE is operating in an NR-DC mode, according to an embodiment.

FIG. 3 illustrates a flow diagram 300 of a failure of SCG measurement reports from a UE to reach an SN on SRB3 because of SCG SpCell degradation when the UE is operating in an NR-DC mode, according to an embodiment. In FIG. 3, the UE functionality has been split into the functionalities of the UE-MCG 302, which illustrates the functions of the UE as they relate to the MN/MCG, and the UE-SCG 304, which illustrates the functions of the (same) UE as they relate to the SN/SCG. The flow diagram 300 also includes an SN 306 and an MN 308 which are in communication with the UE according to an NR-DC mode as previously described (with both the MN 308 and the SN 306 being NR nodes).

The flow diagram 300 illustrates the configuration 310 of an SRB1 and an SRB2 at the UE-MCG 302. The flow diagram 300 further illustrates the configuration 312 of an SRB3 at the UE-SCG 304. Because of the prior configuration 312 of SRB3, it may be that the UE is to make the SCG measurement reports 314 on SRB3, between the UE-SCG 304 and the SN 306. As illustrated, at some point in time the UE (at the UE-SCG 304) experiences the SCG SpCell degradation 316. As part of its operation, the UE-SCG 304 might attempt provide the SN 306 with a SCG measurement report that reflects this degradation, which would ultimately result in the SN 306 to reacting to the SCG SpCell degradation 316 (e.g., via a handover to use another cell of a target node (which may be the SN or a different node altogether) as an SpCell). However, in the case of the flow diagram 300, the SCG measurement reports/retransmissions 318 that would normally be used for this purpose (and which are transmitted on the SCG SpCell) do not reach the SN 306 due to the SCG SpCell degradation 316. This is represented by the use of dotted lines on the SCG measurement reports/retransmissions 318.

The flow diagram 300 further illustrates a SCG failure 320 due to SCG SpCell RLF. Eventually, the failure to communicate to the SN 306 (e.g., after a certain amount of time with no messaging from the SN 306), the UE will recognize a SCG failure 320 condition and send SCG failure information 322 to the MN 308.

Note that the determination of the UE of the SCG failure 320 may not occur immediately with/after the SCG measurement reports/retransmissions 318 fail to be received, but rather it may take some time after the beginning of the set of SCG measurement reports/retransmissions 318 before the UE concludes that the SCG failure 320 has occurred and then sends the SCG failure information 322. During this time, services from the network to the UE on the SN 306 may have already been substantially impacted.

Figure 4:
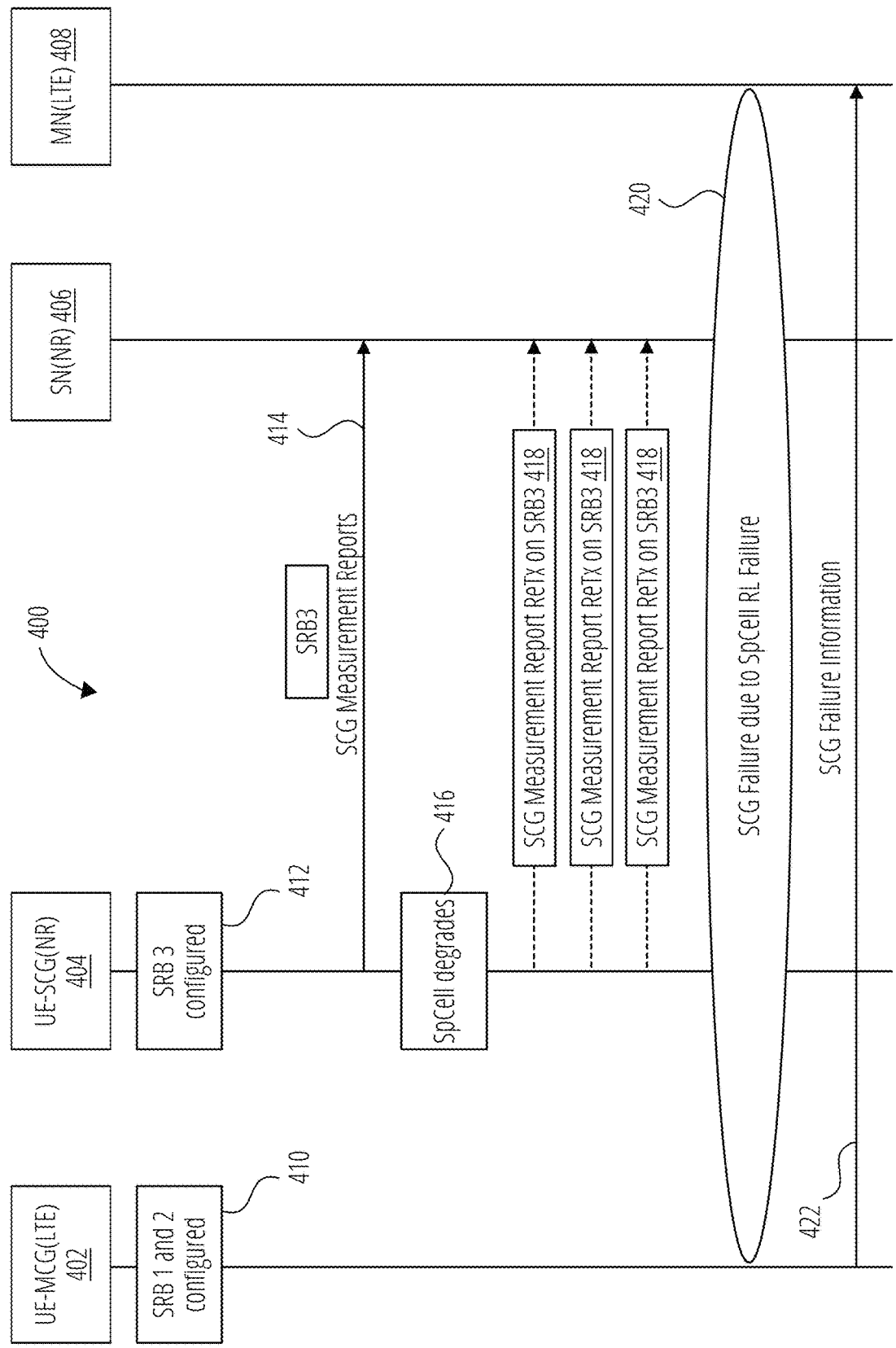
FIG. 4 illustrates a flow diagram of a failure of SCG measurement reports from a UE to reach an SN on SRB3 because of SCG SpCell degradation when the UE is operating in an EN-DC mode, according to an embodiment.

FIG. 4 illustrates a flow diagram 400 of a failure of SCG measurement reports from a UE to reach an SN on SRB3 because of SCG SpCell degradation when the UE is operating in an EN-DC mode, according to an embodiment. In FIG. 4, the UE functionality has been split into the functionalities of the UE-MCG 402, which illustrates the functions of the UE as they relate to the MN/MCG, and the UE-SCG 404, which illustrates the functions of the (same) UE as they relate to the SN/SCG. The flow diagram 400 also includes an SN 406 and an MN 408 which are in communication with the UE according to an EN-DC mode as previously described (with the MN 408 being an LTE node and the SN 406 being an NR node).

The flow diagram 400 illustrates the configuration 410 of an SRB1 and an SRB2 at the UE-MCG 402. The flow diagram 400 further illustrates the configuration 412 of an SRB3 at the UE-SCG 404. Because of the prior configuration 412 of SRB3, it may be that the UE is to make the SCG measurement reports 414 on SRB3, between the UE-SCG 404 and the SN 406. As illustrated, at some point in time the UE (at the UE-SCG 404) experiences the SCG SpCell degradation 416. As part of its operation, the UE-SCG 404 might attempt provide the SN 406 with a SCG measurement report that reflects this degradation, which would ultimately result in the SN 406 to reacting to the SCG SpCell degradation 416 (e.g., via a handover to use another cell of a target node (which may be the SN or a different node altogether) as a SpCell). However, in the case of the flow diagram 400, the SCG measurement reports/retransmissions 418 that would normally be used for this purpose (and which are transmitted on the SCG SpCell) do not reach the SN 406 due to the SCG SpCell degradation 416. This is represented by the use of dotted lines on the SCG measurement reports/retransmissions 418.

The flow diagram 400 further illustrates an SCG failure 420 due to SCG SpCell RLF. Eventually, the failure to communicate to the SN 406 (e.g., after a certain amount of time with no messaging from the SN 406), the UE will recognize a SCG failure 420 condition and send SCG failure information 422 to the MN 408.

Note that the determination of the UE of the SCG failure 420 may not occur immediately with/after the SCG measurement reports/retransmissions 418 fail to be received, but rather it may take some time after the beginning of the set of SCG measurement reports/retransmissions 418 before the UE concludes that the SCG failure 420 has occurred and then sends the SCG failure information 422. During this time, services from the network to the UE on the SN 406 may have already been substantially impacted.

It has been recognized that cases where measurement reports are conditionally triggered at the UE can also be affected when the SpCell of the SCG begins to degrade. For example, a UE may be configured to trigger an SCG measurement report (Event A3) on SRB3 when the current SCG SpCell has a power level that is lower than a neighbor cell by a threshold amount (an A3 condition). This SCG measurement report (Event A3) contains the power level of the SCG SpCell and the power level of the neighbor cell, and indicates the existence of the A3 condition between the SCG SpCell and the neighbor cell (e.g., through the inclusion in the SCT measurement report of a measurement ID that is known to the network to correspond to the A3 condition). Upon receiving this SCG measurement report, the SN 506 recognizes the A3 condition as between the SCG SpCell and the neighbor cell and initiates a handover to the neighbor cell. However, it may be that the A3 condition was caused by SCG SpCell degradation, and that the SCG SpCell has degraded to the extent that the SCG measurement report (Event A3) does not reach the SN. If this SCG measurement report (Event A3) reflecting the A3 condition is not received at the SN, then the SN may not appropriately react (e.g., perform handover to the neighbor cell) to the A3 condition (because it remains uninformed of the A3 condition). If the SCG SpCell continues to degrade, this may eventually result in SCG failure from the point of view of the UE (e.g., an RLF with the SCG SpCell), potentially leading to the disruption of any services to the UE that were being provided to the UE through the SN.

Figure 5:
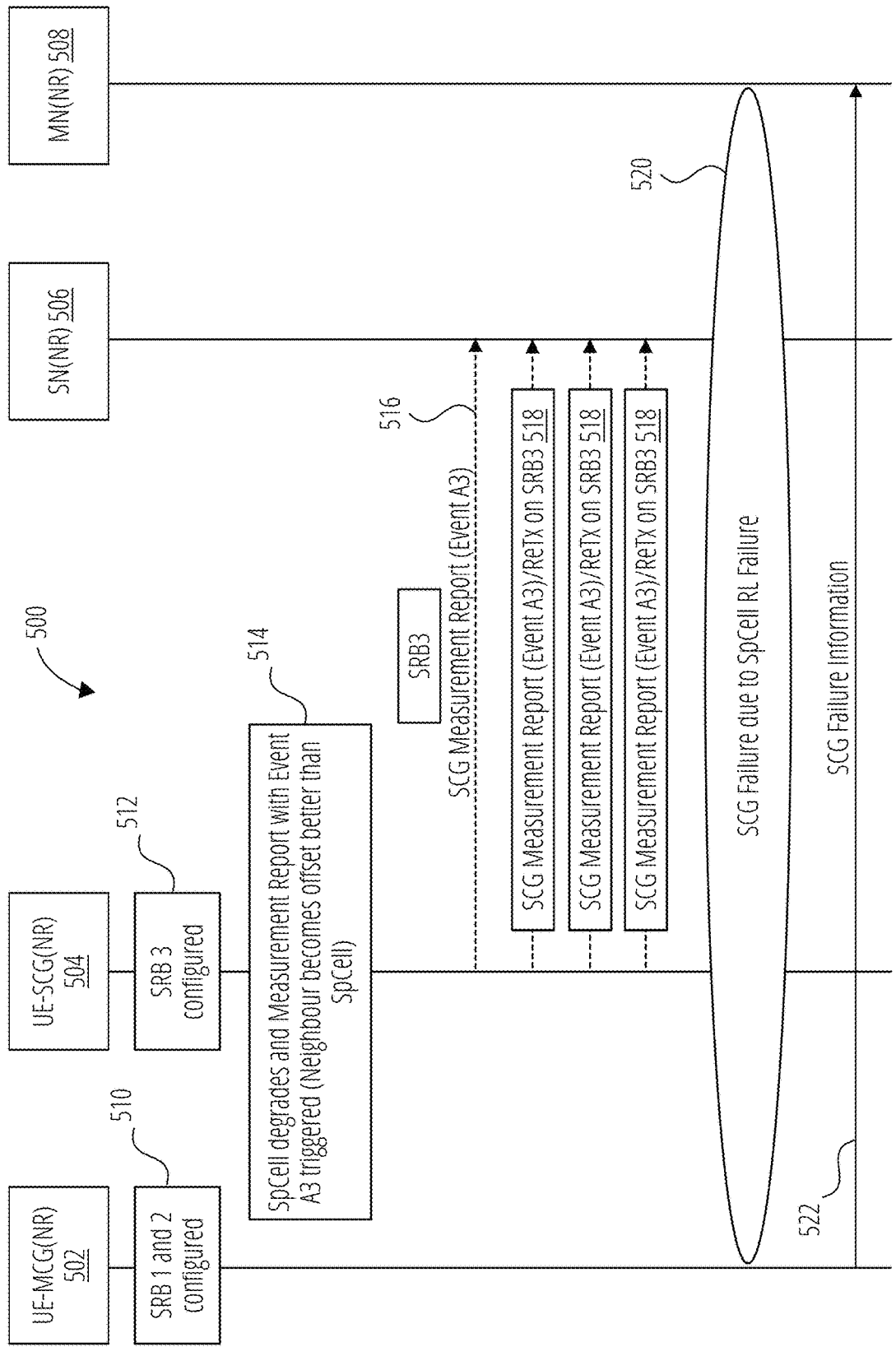
FIG. 5 illustrates a flow diagram of a failure of SCG measurement reports from a UE to reach an SN on SRB3 because of SCG SpCell degradation when the UE is operating in an NR-DC mode, according to an embodiment.

FIG. 5 illustrates a flow diagram 500 of a failure of SCG measurement reports from a UE to reach an SN on SRB3 because of SCG SpCell degradation when the UE is operating in an NR-DC mode, according to an embodiment. In FIG. 5, the UE functionality has been split into the functionalities of the UE-MCG 502, which illustrates the functions of the UE as they relate to the MN/MCG, and the UE-SCG 504, which illustrates the functions of the (same) UE as they relate to the SN/SCG. The flow diagram 500 also includes an SN 506 and an MN 508 which are in communication with the UE according to an NR-DC mode as previously described (with both the MN 508 and the SN 506 being NR nodes).

The flow diagram 500 illustrates the configuration 510 of an SRB1 and an SRB2 at the UE-MCG 502. The flow diagram 500 further illustrates the configuration 512 of an SRB3 at the UE-SCG 504. As illustrated, the trigger 514 for a SCG measurement report (Event A3) 516 then occurs. In the case of the trigger 514, the SCG SpCell has degraded, causing a power of a neighbor cell to be better than the power of the SCG SpCell by an offset or threshold amount. Because of the prior configuration 512 of SRB3, it may be that the UE is to make the responsive SCG measurement report (Event A3) 516 on SRB3, between the UE-SCG 504 and the SN 506. However, in the case of the flow diagram 500, the SCG measurement report (Event A3) 516 (and any follow on SCG measurement reports (Event A3)/retransmissions 518) which are transmitted on the SCG SpCell do not reach the SN 506 due to the SCG SpCell degradation. This is represented by the use of dotted lines on the SCG measurement report (Event A3) 516 and the SCG measurement reports (Event A3)/retransmissions 518.

The flow diagram 500 further illustrates a SCG failure 520 due to SCG SpCell RLF. Eventually, the failure to communicate to the SN 506 (e.g., after a certain amount of time with no messaging from the SN 506), the UE will recognize a SCG failure 520 condition and send SCG failure information 522 to the MN 508.

Note that the determination of the UE of the SCG failure 520 may not occur immediately with/after the SCG measurement report (Event A3) 516 and/or the SCG measurement reports (Event A3)/retransmissions 518 fail to be received, but rather it may take some time after the beginning of the SCG measurement report (Event A3) 516 and/or the SCG measurement reports (Event A3)/retransmissions 518 before the UE concludes that the SCG failure 520 has occurred and then sends the SCG failure information 522. During this time, services from the network to the UE on the SN 506 may have already been substantially impacted.

Figure 6:
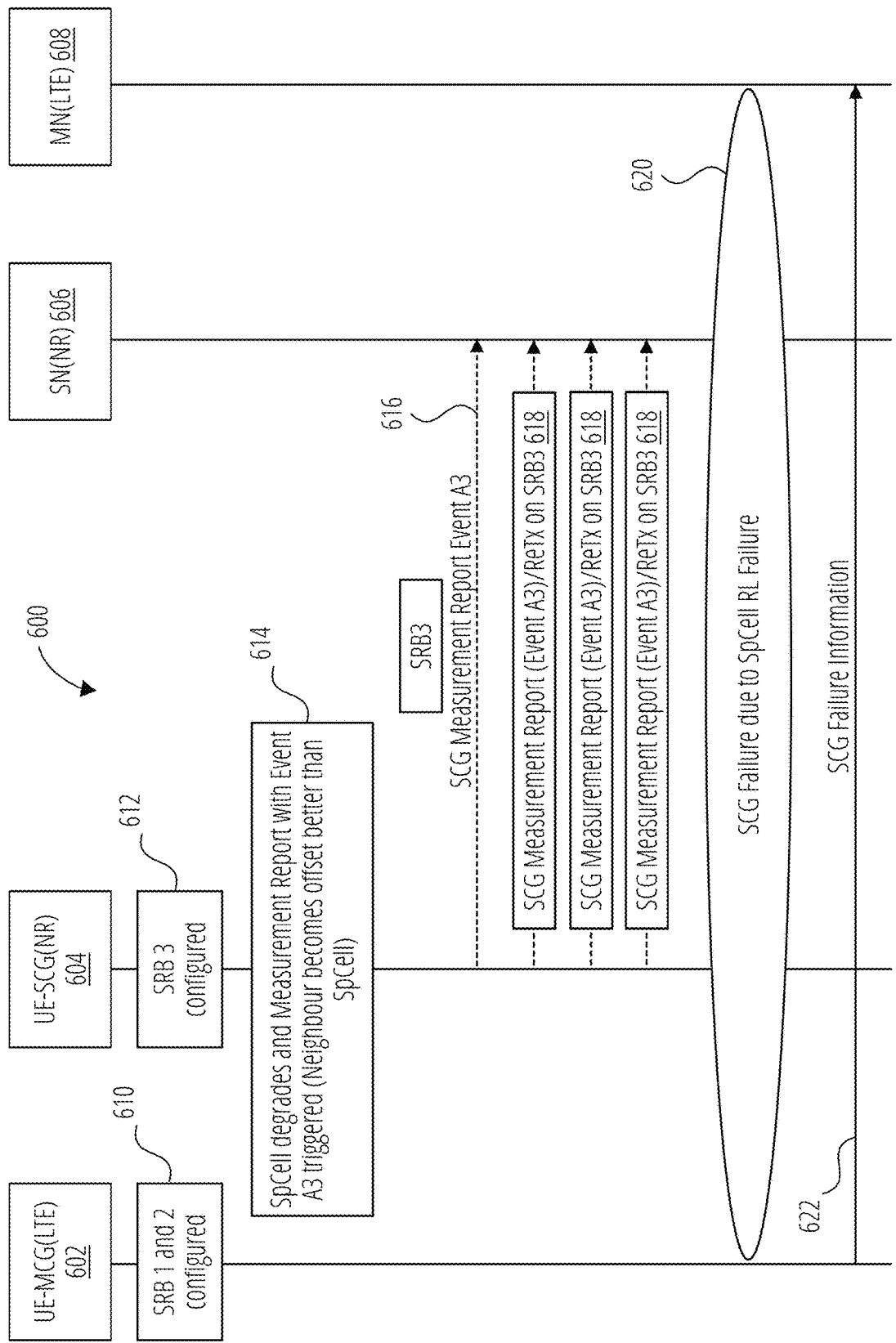
FIG. 6 illustrates a flow diagram of a failure of SCG measurement reports from a UE to reach an SN on SRB3 because of SCG SpCell degradation when the UE is operating in an EN-DC mode, according to an embodiment.

FIG. 6 illustrates a flow diagram 600 of a failure of SCG measurement reports from a UE to reach an SN on SRB3 because of SCG SpCell degradation when the UE is operating in an EN-DC mode, according to an embodiment. In FIG. 6, the UE functionality has been split into the functionalities of the UE-MCG 602, which illustrates the functions of the UE as they relate to the MN/MCG, and the UE-SCG 604, which illustrates the functions of the (same) UE as they relate to the SN/SCG. The flow diagram 600 also includes an SN 606 and an MN 608, which are in communication with the UE according to an EN-DC mode as previously described (with the MN 608 being an LTE node and the SN 606 being an NR node).

The flow diagram 600 illustrates the configuration 610 of an SRB1 and an SRB2 at the UE-MCG 602. The flow diagram 600 further illustrates the configuration 612 of an SRB3 at the UE-SCG 604. As illustrated, the trigger 614 for a SCG measurement report (Event A3) 616 then occurs. In the case of the trigger 614, the SCG SpCell has degraded, causing a power of a neighbor cell to be better than the power of the SCG SpCell by an offset or threshold amount. Because of the prior configuration 612 of SRB3, it may be that the UE is to make the responsive SCG measurement report (Event A3) 616 on SRB3, between the UE-SCG 604 and the SN 606. However, in the case of the flow diagram 600, the SCG measurement report (Event A3) 616 (and any follow on SCG measurement reports (Event A3)/retransmissions 618) which are transmitted on the SCG SpCell do not reach the SN 606 due to the SCG SpCell degradation. This is represented by the use of dotted lines on the SCG measurement report (Event A3) 616 and the SCG measurement reports (Event A3)/retransmissions 618.

The flow diagram 600 further illustrates a SCG failure 620 due to SCG SpCell RLF. Eventually, the failure to communicate to the SN 606 (e.g., after a certain amount of time with no messaging from the SN 606), the UE will recognize a SCG failure 620 condition and send SCG failure information 622 to the MN 608.

Note that the determination of the UE of the SCG failure 620 may not occur immediately with/after the SCG measurement report (Event A3) 616 and/or the SCG measurement reports (Event A3)/retransmissions 618 fail to be received, but rather it may take some time after the beginning of the SCG measurement report (Event A3) 616 and/or the SCG measurement reports (Event A3)/retransmissions 618 before the UE concludes that the SCG failure 620 has occurred and then sends the SCG failure information 622. During this time, services from the network to the UE on the SN 606 may have already been substantially impacted.

Figure 7:
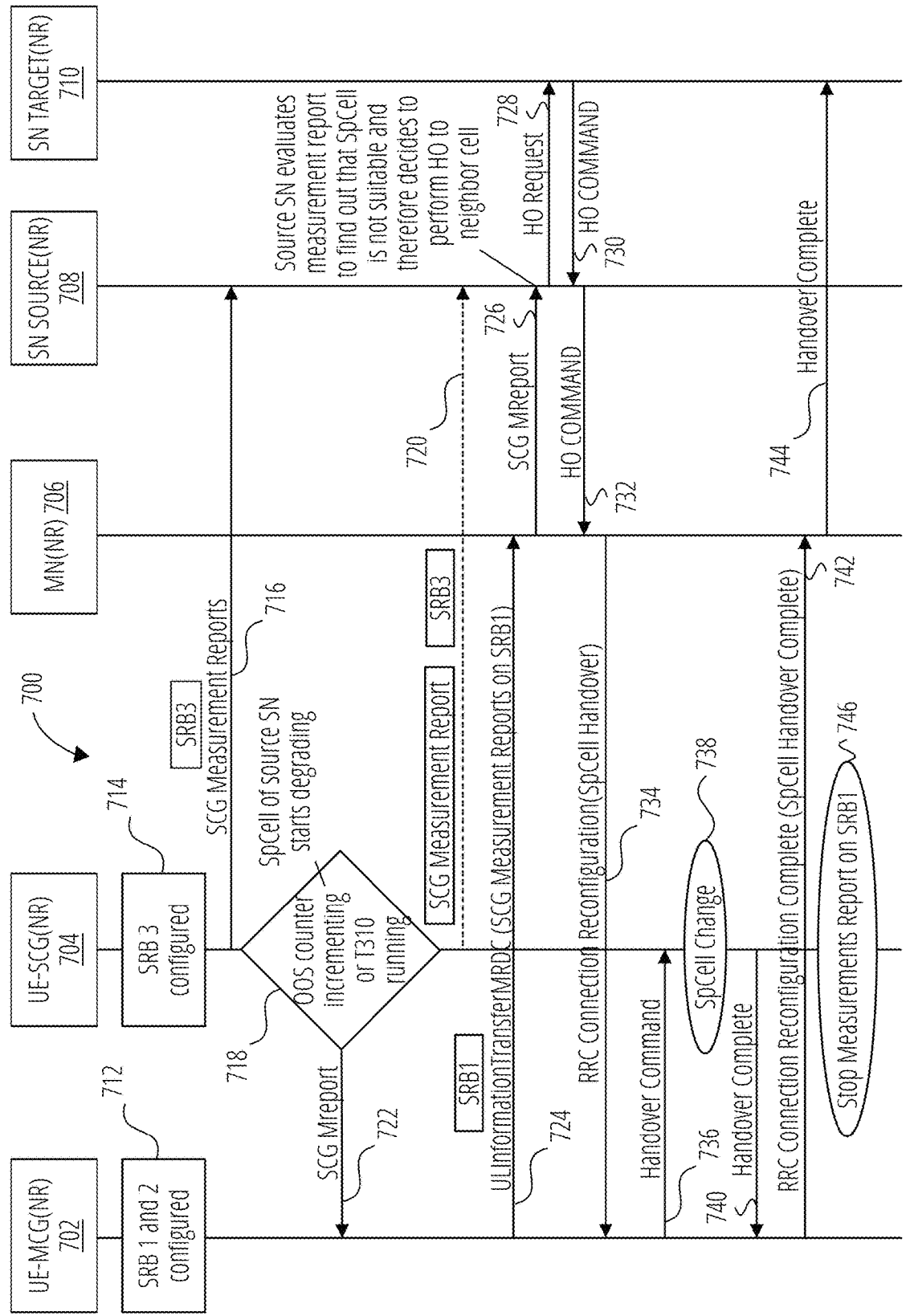
FIG. 7 illustrates a flow diagram of a system using NR-DC that is configured to send SCG measurement reports to both an MN and an SN in response to a handover condition associated with the SN and when SRB3 is configured between a UE and the SN, according to an embodiment.

FIG. 7 illustrates a flow diagram 700 of a system using NR-DC that is configured to send SCG measurement reports to both an MN and an SN in response to a handover condition associated with the SN and when SRB3 is configured between a UE and the SN, according to an embodiment. In FIG. 7, the UE functionality has been split into the functionalities of the UE-MCG 702, which illustrates the functions of the UE as they relate to the MN/MCG, and the UE-SCG 704, which illustrates the functions of the (same) UE as they relate to the one or more SNs/SCGs. The flow diagram 700 also includes an MN 706 and a source SN 708 which at the beginning of the flow diagram 700 are in communication with the UE according to an NR-DC mode as previously described (with both the MN 706 and the source SN 708 being NR nodes). By the end of the flow diagram 700, the source SN 708 will handover to the target SN 710. Note that in some cases, it is anticipated that the source SN 708 and the target SN 710 may be the same NR node, while in other cases the source SN 708 and the target SN 710 may be different NR nodes.

The flow diagram 700 illustrates the configuration 712 of an SRB1 and an SRB2 at the UE-MCG 702. The flow diagram 700 further illustrates the configuration 714 of an SRB3 at the UE-SCG 704. Because of the prior configuration 714 of SRB3, it may be that the UE is to make the SCG measurement reports 716 on SRB3, between the UE-SCG 704 and the source SN 708.

The flow diagram 700 then illustrates that the SpCell of the SCG starts degrading, which causes the handover condition 718. Examples of a handover conditions as used in the flow diagram 700 may include that an out-of-sync (OOS) counter begins incrementing, or that a T310 timer is running at the UE. For example, as the SpCell of the SCG degrades, the UE may begin to fall out of synchronization with it. This is detected by lower layers at the UE, which send OOS indicators to RRC of the UE. These OOS indicators are reported at the UE-SCG 704 functionality through the use of an incrementing OOS counter. Further, in some embodiments, once the OOS counter has reached a certain value, a T310 timer may be started that the UE will use to determine when to report an RLF of the SCG SpCell to the MN. Accordingly, the UE of the flow diagram 700 may watch for either of the incrementing of the OOS counter and/or the running of the T310 timer (as a "handover condition 718") in order to trigger balance of the flow diagram 700.

Once the handover condition 718 has been identified at the UE, the UE may in response send SCG measurement reports. One or more of these may be as the SCG measurement report 720, which is sent (via RRC) from the UE-SCG 704 to the source SN 708 on SRB3, in the manner described previously. However, the sending of the SCG measurement report 720 to the source SN 708 may fail as a result of the SCG SpCell degradation. The SCG measurement report is also provided 722 to the UE-MCG 702, which then sends it (via E-UTRA-RRC) to the MN 706 on SRB1 as part of a ULInformationTransferMRDC message 724. The ULInformation TransferMRDC message 724 may be a message that indicates to the receiving MN that the contents of such message should be forwarded to the current SN. Note that while not illustrated, the UE-MCG 702 may continue to (re) send the ULInformation TransferMRDC message 724 (perhaps with an updated SCG measurement report) on SRB1 until handover of the UE to the target SN 710 is ultimately achieved (or SCG SpCell conditions improve).

As illustrated, once the MN 706 receives the ULInformation TransferMRDC message 724, the SCG measurement report 726 is forwarded to the source SN 708. Thus, in embodiments according to FIG. 7, even if the SCG measurement report 720 fails, it is likely that the information still reaches the source SN 708 in any event, due to fact that it was (also) sent by the UE-MCG 702 to the MN 706 and from there forwarded to the source SN 708.

As illustrated in FIG. 7, the source SN 708, having received the SCG measurement report 726 from the UE-MCG 702, is accordingly capable, based on the contents of the source SN 708, of recognizing the relevant aspects of the condition of the degrading SCG SpCell. For example, the SCG measurement report 726 may indicate that a power level of the SCG SpCell at the UE is poor or otherwise not suitable. The SCG measurement report 726 may also aid in the identification of a suitable neighbor cell on the target SN 710 (e.g., according to a power of the neighbor cell as reported in the SCG measurement report 726). The source SN 708 accordingly determines that a handover to the identified neighbor cell of the target SN 710 is appropriate, and sends a handover request 728 to the target SN 710 to initiate this process.

The target SN 710 replies to the source SN 708 with a handover command 730, which is forwarded 732 to the MN 706. The MN 706 then sends an RRC Connection Reconfiguration message 734 containing a SpCell Handover message from the handover command 730/732 informing the UE-MCG 702 of the handover to the identified neighbor cell on the target SN 710. A corresponding handover command 736 containing the SpCell Handover message is generated by the UE-MCG 702 functionality and sent to the UE-SCG 704. The UE-SCG 704 then performs the SpCell change 738 to the neighbor cell.

To perform the SpCell change 738, the UE-SCG 704 hands over to neighbor cell of the target SN 710, as instructed by the handover command 736. After handover, this neighbor cell acts as the SpCell for the UE-SCG 704. This SpCell has an associated SCG and SN (the target SN 710).

It is contemplated that the SN performing a handover determines that the neighbor cell to handover to is a cell of a different NR node. Accordingly, in this sense of FIG. 7, it may be that the source SN 708 and the target SN 710 are different NR nodes. It is contemplated that in these cases, the new SpCell will accordingly be part of a new SCG having zero or more additional cells other than those of the SCG associated with the prior SpCell, as provided by the new NR node.

It is further contemplated that the target SN may be the same NR node as the current SN. For example, in the case where a SN performing a handover determines that the neighbor cell to handover to is another cell of the same NR node, this is allowed. Accordingly, in the sense of FIG. 7, it may be that the source SN 708 and the target SN 710 are the same NR node. It is contemplated that in these cases, the new SpCell for the UE may accordingly be associated with an SCG constituted of a same, a different, or a partially different set of zero or more additional cells as compared to the SCG associated with the prior SpCell. In the case of, for example, the source SN 708 and the target SN 710 being the same NR node, the handover request 728 and the handover command 730 as illustrated may not be passed (or may be handled only internally to that same NR node).

After completing the SpCell change 738, the UE-SCG 704 functionality provides the handover complete message 740 to the UE-MCG 702 functionality of the UE. The UE-MCG 702 then sends the RRC Connection Reconfiguration Complete message 742 containing the handover complete message 740 to the MN 706, which then forwards 744 the handover complete message 740 to the target SN 710 to inform/confirm to the target SN 710 that the UE has completed the instructed handover. At this stage, the UE-SCG 704 also stops 746 any measurement reports on the SRB1 associated with the handover condition 718 (which may have been intentionally repeated until handover was performed by the network, as described above).

Compared to embodiments found in, for example, FIG. 3, a system for NR-DC as in FIG. 7 that detects the handover condition 718 and reacts as described may be more responsive to the degrading of the SCG SpCell of the source SN 708. Accordingly, the risk of substantial impediment of services to the UE that are being provided by the source SN 708 (and, after handover, perhaps the target SN 710) is reduced.

Figure 8:
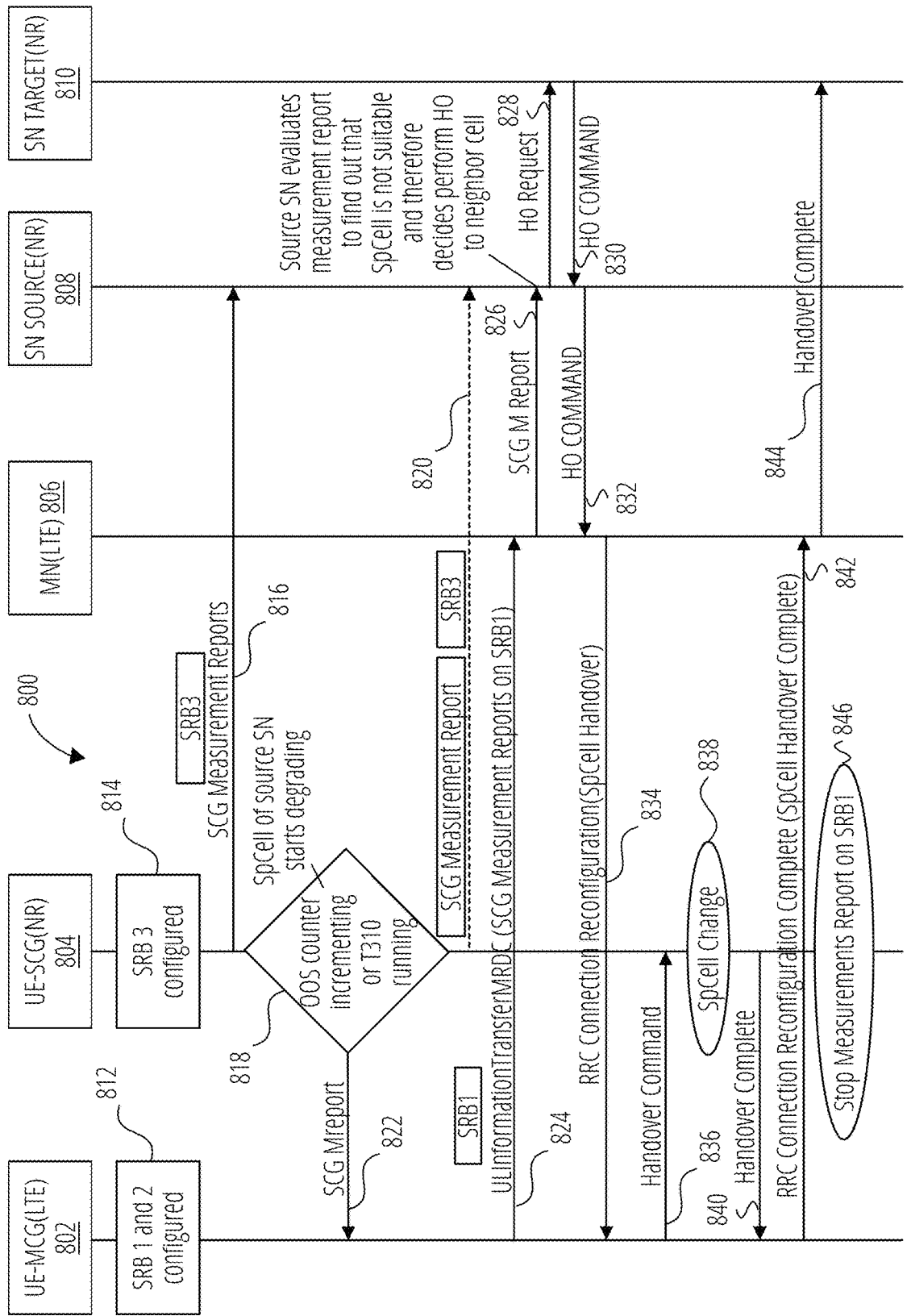
FIG. 8 illustrates a flow diagram of a system using EN-DC that is configured to send SCG measurement reports to both an MN and an SN in response to a handover condition associated with the SN and when SRB3 is configured between a UE and the SN, according to an embodiment.

FIG. 8 illustrates a flow diagram 800 of a system using EN-DC that is configured to send SCG measurement reports to both an MN and an SN in response to a handover condition associated with the SN and when SRB3 is configured between a UE and the SN, according to an embodiment. In FIG. 8, the UE functionality has been split into the functionalities of the UE-MCG 802, which illustrates the functions of the UE as they relate to the MN/MCG, and the UE-SCG 804, which illustrates the functions of the (same) UE as they relate to the one or more SNs/SCGs. The flow diagram 800 also includes an MN 806 and a source SN 808 which at the beginning of the flow diagram 800 are in communication with the UE according to an EN-DC mode as previously described (with the MN 806 being an LTE node and the source SN 808 being an NR node). By the end of the flow diagram 800, the source SN 808 will handover to the target SN 810. Note that in some cases, it is anticipated that the source SN 808 and the target SN 810 may be the same NR nodes, while in other cases the source SN 808 and the target SN 810 may be different NR nodes.

The flow diagram 800 illustrates the configuration 812 of an SRB1 and an SRB2 at the UE-MCG 802. The flow diagram 800 further illustrates the configuration 814 of an SRB3 at the UE-SCG 804. Because of the prior configuration 814 of SRB3, it may be that the UE is to make the SCG measurement reports 816 on SRB3, between the UE-SCG 804 and the source SN 808.

The flow diagram 800 then illustrates that the SpCell of the SCG starts degrading, which causes the handover condition 818. Examples of a handover conditions as used in the flow diagram 800 may include that an out-of-sync (OOS) counter begins incrementing, or that a T310 timer is running at the UE. For example, as the SpCell of the SCG degrades, the UE may begin to fall out of synchronization with it. This is detected by lower layers at the UE, which send OOS indicators to RRC of the UE. These OOS indicators are reported at the UE-SCG 804 functionality through the use of an incrementing OOS counter. Further, in some embodiments, once the OOS counter has reached a certain value, a T310 timer may be started that the UE will use to determine when to report an RLF of the SCG SpCell to the MN. Accordingly, the UE of the flow diagram 800 may watch for either of the incrementing of the OOS counter and/or the running of the T310 timer (as a "handover condition 818") in order to trigger balance of the flow diagram 800.

Once the handover condition 818 has been identified at the UE, the UE may in response send SCG measurement reports. One or more of these may be as the SCG measurement report 820, which is sent from the UE-SCG 804 to the source SN 808 on SRB3, in the manner described previously. However, the sending of the SCG measurement report 820 to the source SN 808 may fail as a result of the SCG SpCell degradation. The SCG measurement report is also provided 822 to the UE-MCG 802, which then sends it (via E-UTRA-RRC) to the MN 806 on SRB1 as part of a ULInformation TransferMRDC message 824. The ULInformation TransferMRDC message 824 may be a message that indicates to the receiving MN that the contents of such message should be forwarded to the current SN. Note that while not illustrated, the UE-MCG 802 may continue to (re) send the ULInformation TransferMRDC message 824 (perhaps with an updated SCG measurement report) on SRB1 until handover of the UE to the target SN 810 is ultimately achieved (or SCG SpCell conditions improve).

As illustrated, once the MN 806 receives the ULInformation TransferMRDC message 824, the SCG measurement report 826 is forwarded to the source SN 808. Thus, in embodiments according to FIG. 8, even if the SCG measurement report 820 fails, it is likely that the information still reaches the source SN 808 in any event, due to fact that it was (also) sent by the UE-MCG 802 to the MN 806 and from there forwarded to the source SN 808.

As illustrated in FIG. 8, the source SN 808, having received the SCG measurement report 826 from the UE-MCG 802, is accordingly capable, based on the contents of the source SN 808, of recognizing the relevant aspects of the condition of the degrading SCG SpCell. For example, the SCG measurement report 826 may indicate that a power level of the SCG SpCell at the UE is poor or otherwise not suitable. The SCG measurement report 826 may also aid in the identification of a suitable neighbor cell on the target SN 810 (e.g., according to a power of the neighbor cell as reported in the SCG measurement report 826). The source SN 808 accordingly determines that a handover to the identified neighbor cell of the target SN 810 is appropriate, and sends a handover request 8281 to the target SN 810 to initiate this process.

The target SN 810 replies to the source SN 808 with a handover command 830, which is forwarded 832 to the MN 806. The MN 806 then sends an RRC Connection Reconfiguration message 834 containing a SpCell Handover message from the handover command 830/832 informing the UE-MCG 802 of the handover to the identified neighbor cell on the target SN 810. A corresponding handover command 836 containing the SpCell Handover message is generated by the UE-MCG 802 functionality and sent to the UE-SCG 804. The UE-SCG 804 then performs the SpCell change 838 to the neighbor cell.

To perform the SpCell change 838, the UE-SCG 804 hands over to neighbor cell of the target SN 810, as instructed by the handover command 836. After handover, this neighbor cell acts as the SpCell for the UE-SCG 804. This SpCell has an associated SCG and SN (the target SN 810).

It is contemplated that the SN performing a handover determines that the neighbor cell to handover to is a cell of a different NR node. Accordingly, in this sense of FIG. 8, it may be that the source SN 808 and the target SN 810 are different NR nodes. It is contemplated that in these cases, the new SpCell will accordingly be part of a new SCG having zero or more additional cells other than those of the SCG associated with the prior SpCell, as provided by the new NR node.

It is further contemplated that the target SN may be the same NR node as the current SN. For example, in the case where a SN performing a handover determines that the neighbor cell to handover to is another cell of the same NR node, this is allowed. Accordingly, in the sense of FIG. 8, it may be that the source SN 808 and the target SN 810 are the same NR node. It is contemplated that in these cases, the new SpCell for the UE may accordingly be associated with an SCG constituted of a same, a different, or a partially different set of zero or more additional cells as compared to the SCG associated with the prior SpCell. In the case of, for example, the source SN 808 and the target SN 810 being the same NR node, the handover request 828 and the handover command 830 as illustrated may not be passed (or may be handled only internally to that same NR node).

After completing the SpCell change 838, the UE-SCG 804 functionality provides the handover complete message 840 to the UE-MCG 802 functionality of the UE. The UE-MCG 802 then sends the RRC Connection Reconfiguration Complete message 842 containing the handover complete message 840 to the MN 806, which forwards the forwards 844 the handover complete message 840 to the target SN 810 to inform/confirm to the target SN 810 that the UE has completed the instructed handover. At this stage, the UE-SCG 804 also stops 846 any measurement reports on the SRB1 associated with the handover condition 818 (which may have been intentionally repeated until handover was performed by the network, as described above).

Compared to embodiments found in, for example, FIG. 4, a system for EN-DC as in FIG. 8 that detects the handover condition 818 and reacts as described may be more responsive to the degrading of the SCCG SpCell of the source SN 808. Accordingly, the risk of substantial impediment of services to the UE that are being provided by the source SN 808 (and, after handover, perhaps the target SN 810) is reduced.

Figure 9:
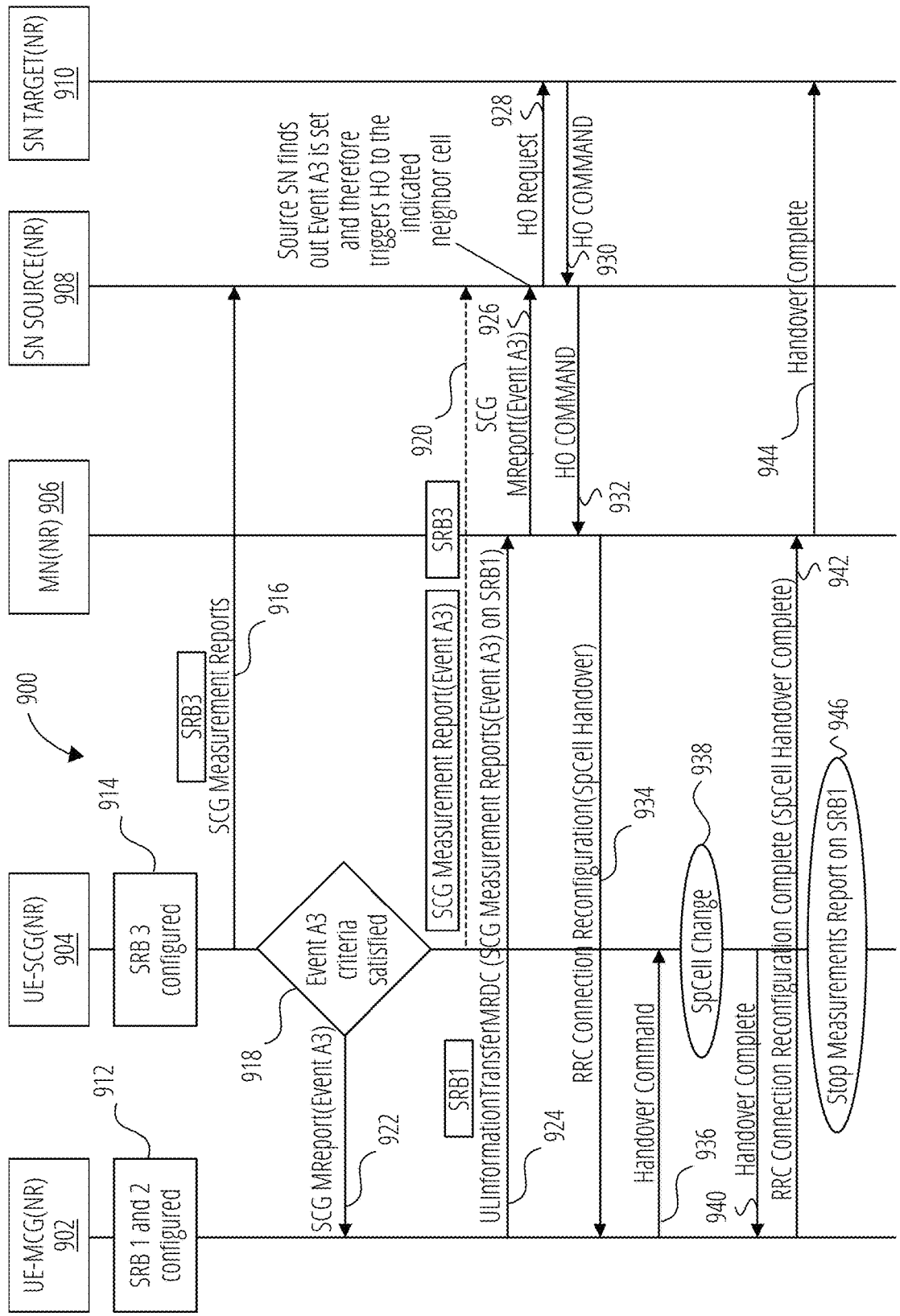
FIG. 9 illustrates a flow diagram of a system using NR-DC that is configured to send SCG measurement reports to both an MN and an SN in response to a handover condition associated with the SN and when SRB3 is configured between a UE and the SN, according to an embodiment.

FIG. 9 illustrates a flow diagram 900 of a system using NR-DC that is configured to send SCG measurement reports to both an MN and an SN in response to a handover condition associated with the SN and when SRB3 is configured between a UE and the SN, according to an embodiment. In FIG. 9, the UE functionality has been split into the functionalities of the UE-MCG 902, which illustrates the functions of the UE as they relate to the MN/MCG, and the UE-SCG 904, which illustrates the functions of the (same) UE as they relate to the one or more SNs/SCGs. The flow diagram 900 also includes an MN 906 and a source SN 908 which at the beginning of the flow diagram 900 are in communication with the UE according to an NR-DC mode as previously described (with both the MN 906 and the source SN 908 being NR nodes). By the end of the flow diagram 900, the source SN 908 will handover to the target SN 910. Note that in some cases, it is anticipated that the source SN 908 and the target SN 910 may be the same NR node, while in other cases the source SN 908 and the target SN 910 may be different NR nodes.

The flow diagram 900 illustrates the configuration 912 of an SRB1 and an SRB2 at the UE-MCG 902. The flow diagram 900 further illustrates the configuration 914 of an SRB3 at the UE-SCG 904. Because of the prior configuration 914 of SRB3, it may be that the UE is to make the SCG measurement reports 916 on SRB3, between the UE-SCG 904 and the source SN 908.

The flow diagram 900 then illustrates the handover condition 718, which is an identification by the UE that Event A3 criteria has been satisfied as between the SCG SpCell of the source SN 908 and a neighbor cell. For example, the UE may identify that a neighbor cell on the target SN 910 is better (e.g., has a higher power measured at the UE) than the SCG SpCell on the source SN 908 by a threshold amount.

Once the handover condition 918 has been identified at the UE, the UE may send SCG measurement reports (Event A3). One or more of these may be as the SCG measurement report (Event A3) 920, which is sent from the UE-SCG 904 to the source SN 908 on SRB3, in the manner described previously. However, the sending of the SCG measurement report (Event A3) 920 to the source SN 908 may fail as a result of any degradation on the current SCG SpCell (e.g., in the case that degradation of the current SCG SpCell was a cause of the A3 condition between the SCG SpCell and the neighbor cell). The SCG measurement report is also provided 922 to the UE-MCG 902, which then sends it (via RRC) to the MN 906 on SRB1 as part of a ULInformationTransferMRDC message 924. The ULInformationTransferMRDC message 924 may be a message that indicates to the receiving MN that the contents of such message should be forwarded to the current SN. Note that while not illustrated, the UE-MCG 902 (via RRC) may continue to (re) send the ULInformationTransferMRDC message 924 (perhaps with an updated SCG measurement report (Event A3)) on SRB1 until handover of the UE to the target SN 910 is ultimately achieved (or SCG SpCell conditions improve).

As illustrated, once the MN 906 receives the ULInformationTransferMRDC message 924, the SCG measurement report (Event A3) 926 is forwarded to the source SN 908. Thus, in embodiments according to FIG. 9, even if the SCG measurement report (Event A3) 920 fails, it is likely that the information still reaches the source SN 908 in any event, due to fact that it was (also) sent by the UE-MCG 902 to the MN 906 and from there forwarded to the source SN 908.

As illustrated in FIG. 9, the source SN 908, having received the SCG measurement report (Event A3) 926 from the UE-MCG 902, is thereby informed of the existence of the A3 condition and the identity of the neighbor cell on the target SN 910. The source SN 908 accordingly determines that a handover to the identified neighbor cell of the target SN 910 is appropriate, and sends a handover request 928 to the target SN 910 to initiate this process.

The target SN 910 replies to the source SN 908 with a handover command 930, which is forwarded 932 to the MN 906. The MN 906 then sends an RRC Connection Reconfiguration message 934 containing a SpCell Handover message from the handover command 930/932 informing the UE-MCG 902 of the handover to the identified neighbor cell of the target SN 910. A corresponding handover command 936 containing the SpCell Handover message is generated by the UE-MCG 902 functionality and sent to the UE-SCG 904. The UE-SCG 904 then performs the SpCell change 938 to the neighbor cell.

To perform the SpCell change 938, the UE-SCG 904 hands over to the neighbor cell of the target SN 910, as instructed by the handover command 936. After handover, this neighbor cell acts as the SpCell for the UE-SCG 904. This SpCell has an associated SCG and SN (the target SN 910).

It is contemplated that the SN performing a handover determines that the neighbor cell to handover to is a cell of a different NR node. Accordingly, in this sense of FIG. 9, it may be that the source SN 908 and the target SN 910 are different NR nodes. It is contemplated that in these cases, the new SpCell will accordingly be part of a new SCG having zero or more additional cells other than those of the SCG associated with the prior SpCell, as provided by the new NR node.

It is further contemplated that the target SN may be the same NR node as the current SN. For example, in the case where a SN performing a handover determines that the neighbor cell to handover to is another cell of the same NR node, this is allowed. Accordingly, in the sense of FIG. 9, it may be that the source SN 908 and the target SN 910 are the same NR node. It is contemplated that in these cases, the new SpCell for the UE may accordingly be associated with an SCG constituted of a same, a different, or a partially different set of zero or more additional cells as compared to the SCG associated with the prior SpCell. In the case of, for example, the source SN 908 and the target SN 910 being the same NR node, the handover request 928 and the handover command 930 as illustrated may not be passed (or may be handled only internally to that same NR node).

After completing the SpCell change 1038, the UE-SCG 1004 functionality provides the handover complete message 1040 to the UE-MCG 1002 functionality of the UE. The UE-MCG 1002 then sends the RRC Connection Reconfiguration Complete message 1042 containing the handover complete message 1040 to the MN 1006, which forwards 1044 the handover complete message 1040 to the target SN 1010 to inform/confirm to the target SN 1010 that the UE has completed the instructed handover. At this stage, the UE-SCG 1004 also stops 1046 any measurement reports on the SRB1 associated with the handover condition 1018 (which may have been intentionally repeated until handover was performed by the network, as described above).

Figure 10:
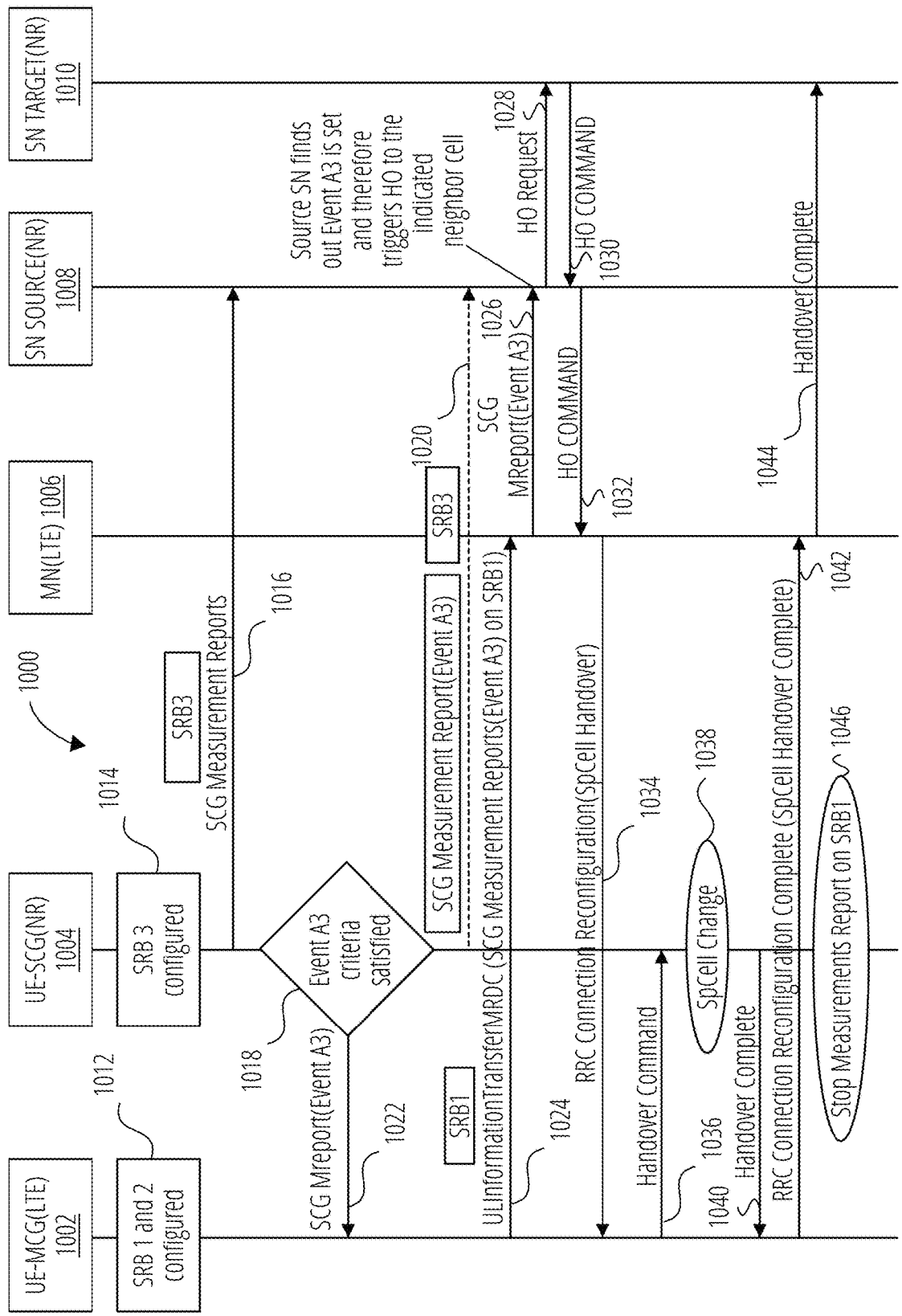
FIG. 10 illustrates a flow diagram of a system using EN-DC that is configured to send SCG measurement reports to both an MN and an SN in response to a handover condition associated with the SN and when SRB3 is configured between a UE and the SN, according to an embodiment.

Compared to embodiments found in, for example, FIG. 6, a system for EN-DC as in FIG. 10 that detects the handover condition 1018 and reacts as described may be more responsive to the potential degrading of the SCG SpCell of the source SN 1008 that may be a cause of the A3 condition. Accordingly, the risk of substantial impediment of services to the UE that are being provided by the source SN 1008 (and, after handover, perhaps the target SN 1010) is reduced.

FIG. 10 illustrates a flow diagram 1000 of a system using EN-DC that is configured to send SCG measurement reports to both an MN and an SN in response to a handover condition associated with the SN and when SRB3 is configured between a UE and the SN, according to an embodiment. In FIG. 10, the UE functionality has been split into the functionalities of the UE-MCG 1002, which illustrates the functions of the UE as they relate to the MN/MCG, and the UE-SCG 1004, which illustrates the functions of the (same) UE as they relate to the one or more SNs/SCGs. The flow diagram 1000 also includes an MN 1006 and a source SN 1008 which at the beginning of the flow diagram 1000 are in communication with the UE according to an EN-DC mode as previously described (with the MN 1006 being an LTE node and the source SN 1008 being an NR node). By the end of the flow diagram 1000, the source SN 1008 will handover to the target SN 1010. Note that in some cases, it is anticipated that the source SN 1008 and the target SN 1010 may be the same NR node, while in other cases the source SN 1008 and the target SN 1010 may be different NR nodes.

The flow diagram 1000 illustrates the configuration 1012 of an SRB1 and an SRB2 at the UE-MCG 1002. The flow diagram 1000 further illustrates the configuration 1014 of an SRB3 at the UE-SCG 1004. Because of the prior configuration 1014 of SRB3, it may be that the UE is to make the SCG measurement reports 1016 on SRB3, between the UE-SCG 1004 and the source SN 1008.

The flow diagram 1000 then illustrates the handover condition 1018, which is an identification by the UE that Event A3 criteria has been satisfied as between the SCG SpCell of the source SN 1008 and a neighbor cell. For example, the UE may identify that a neighbor cell on the target SN 1010 is better (e.g., has a higher power measured at the UE) than the SCG SpCell on the source SN 1008 by a threshold amount.

Once the handover condition 1018 has been identified at the UE, the UE may send SCG measurement reports (Event A3). One or more of these may be as the SCG measurement report (Event A3) 1020, which is sent from the UE-SCG 1004 to the source SN 1008 on SRB3, in the manner described previously. However, the sending of the SCG measurement report (Event A3) 1020 to the source SN 1008 may fail as a result of any degradation on the current SCG SpCell (e.g., in the case that degradation of the current SCG SpCell was a cause of the A3 condition between the SCG SpCell and the neighbor cell). The SCG measurement report is also provided 1022 to the UE-MCG 1002, which then sends it (via RRC) to the MN 1006 on SRB1 as part of a ULInformation TransferMRDC message 1024. The ULInformation TransferMRDC message 1024 may be a message that indicates to the receiving MN that the contents of such message should be forwarded to the current SN. Note that while not illustrated, the UE-MCG 1002 (via RRC) may continue to (re) send the ULInformation TransferMRDC message 1024 (perhaps with an updated SCG measurement report (Event A3)) on SRB1 until handover of the UE to the target SN 1010 is ultimately achieved (or SCG SpCell conditions improve).

As illustrated, once the MN 1006 receives the ULInformationTransferMRDC message 1024, the SCG measurement report (Event A3) 1026 is forwarded to the source SN 1008. Thus, in embodiments according to FIG. 10, even if the SCG measurement report (Event A3) 1020 fails, it is likely that the information still reaches the source SN 1008 in any event, due to fact that it was (also) sent by the UE-MCG 1002 to the MN 1006 and from there forwarded to the source SN 1008.

As illustrated in FIG. 10, the source SN 1008, having received the SCG measurement report (Event A3) 1026 from the UE-MCG 1002, is thereby informed of the existence of the A3 condition and the identity of the neighbor cell on the target SN 1010. The source SN 1008 accordingly determines that a handover to the identified neighbor cell of the target SN 1010 is appropriate, and sends a handover request 1028 to the target SN 1010 to initiate this process.

The target SN 1010 replies to the source SN 1008 with a handover command 1030, which is forwarded 1032 to the MN 1006. The MN 1006 then sends an RRC Connection Reconfiguration message 1034 containing a SpCell Handover message from the handover command 1030/1032 informing the UE-MCG 1002 of the handover to the identified neighbor cell of the target SN 1010. A corresponding handover command 1036 containing the SpCell Handover message is generated by the UE-MCG 1002 functionality and sent to the UE-SCG 1004. The UE-SCG 1004 then performs the SpCell change 1038 to the neighbor cell.

To perform the SpCell change 1038, the UE-SCG 1004 hands over to the neighbor cell of the target SN 1010, as instructed by the handover command 1036. After handover, this neighbor cell acts as the SpCell for the UE-SCG 1004. This SpCell has an associated SCG and SN (the target SN 1010).

It is contemplated that the SN performing a handover determines that the neighbor cell to handover to is a cell of a different NR node. Accordingly, in this sense of FIG. 10, it may be that the source SN 1008 and the target SN 1010 are different NR nodes. It is contemplated that in these cases, the new SpCell will accordingly be part of a new SCG having zero or more additional cells other than those of the SCG associated with the prior SpCell, as provided by the new NR node.

It is further contemplated that the target SN may be the same NR node as the current SN. For example, in the case where a SN performing a handover determines that the neighbor cell to handover to is another cell of the same NR node, this is allowed. Accordingly, in the sense of FIG. 10, it may be that the source SN 1008 and the target SN 1010 are the same NR node. It is contemplated that in these cases, the new SpCell for the UE may accordingly be associated with an SCG constituted of a same, a different, or a partially different set of zero or more additional cells as compared to the SCG associated with the prior SpCell. In the case of, for example, the source SN 1008 and the target SN 1010 being the same NR node, the handover request 1028 and the handover command 1030 as illustrated may not be passed (or may be handled only internally to that same NR node).

After completing the SpCell change 938, the UE-SCG 904 functionality provides the handover complete message 940 to the UE-MCG 902 functionality of the UE. The UE-MCG 902 then sends the RRC Connection Reconfiguration Complete message 942 containing the handover complete message 940 to the MN 906, which forwards 944 the handover complete message 940 to the target SN 910 to inform/confirm to the target SN 910 that the UE has completed the instructed handover. At this stage, the UE-SCG 904 also stops 946 any measurement reports on the SRB1 associated with the handover condition 918 (which may have been intentionally repeated until handover was performed by the network, as described above).

Compared to embodiments found in, for example, FIG. 5, a system for NR-DC as in FIG. 9 that detects the handover condition 918 and reacts as described may be more responsive to the potential degrading of the SCG SpCell of the source SN 908 that may be a cause of the A3 condition. Accordingly, the risk of substantial impediment of services to the UE that are being provided by the source SN 908 (and, after handover, perhaps the target SN 910) is reduced.

Figure 11:
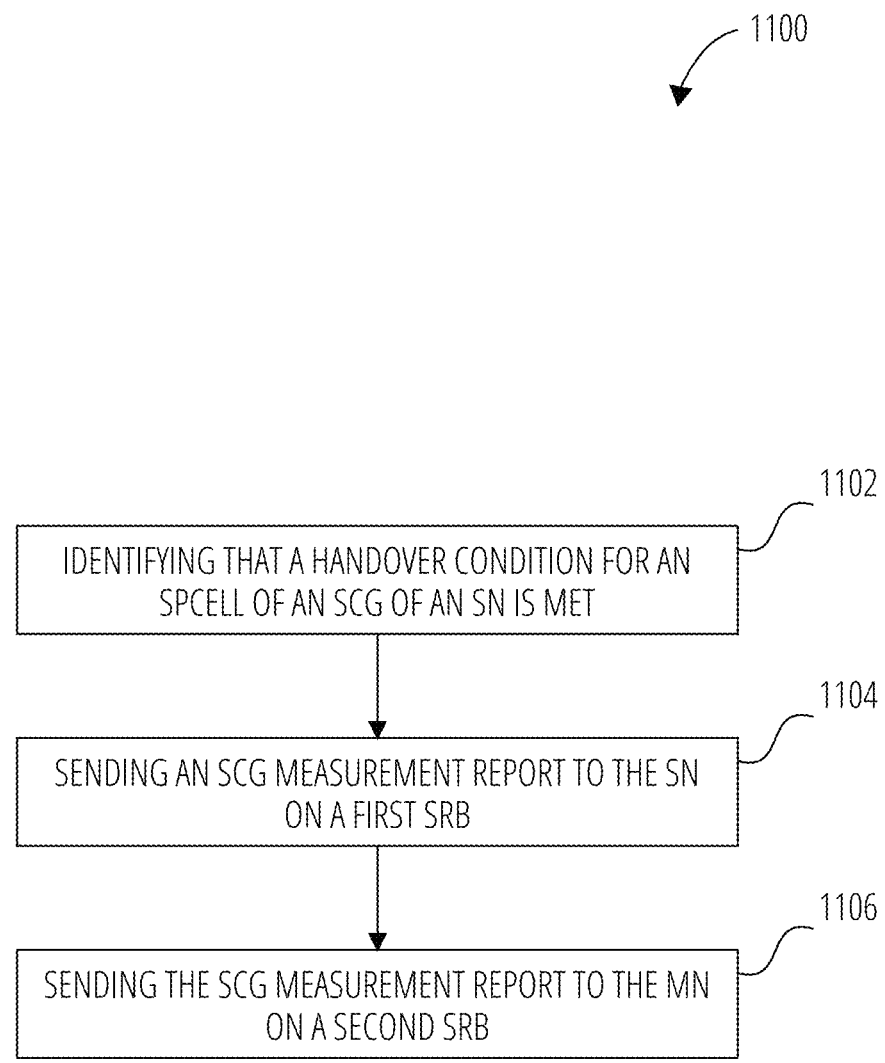
FIG. 11 illustrates a method of a UE operating in an MR-DC mode with an MN and an SN, according to an embodiment.

FIG. 11 illustrates a method 1100 of a UE operating in an MR-DC mode with an MN and an SN, according to an embodiment. The method 1100 includes identifying 1102 that a handover condition for an SpCell of an SCG of the SN is met.

The method 1100 further includes sending 1104 an SCG measurement report to the SN on a first SRB. This may occur in response to the identifying 1102 that the handover condition of the SpCell of the SCG of the SN is met.

The method 1100 further includes sending 1106 the SCG measurement report to the MN on a second SRB. This may occur in response to the identifying 1102 that the handover condition of the SpCell of the SCG of the SN is met.

In some embodiments of the method 1100, the identifying 1102 that the handover condition for the SpCell is met comprises identifying that a neighbor cell of a target node is better than the SpCell by a threshold amount.

In some embodiments of the method 1100, the identifying 1102 that the handover condition for the SpCell is met comprises identifying that one or more OOS indications have been received from a lower layer.

In some embodiments of the method 1100, the identifying 1102 that the handover condition for the SpCell is met comprises identifying that a T310 timer is running at the UE.

In some embodiments of the method 1100, the SCG measurement report that is sent to the MN on the second SRB is sent in a ULInformationTransferMRDC message.

In some embodiments of the method 1100, the first SRB is an SRB3 and the second SRB is an SRB1.

In some embodiments of the method 1100, the SCG of the SN comprises a plurality of cells including the SpCell.

In some embodiments of the method 1100, the MR-DC mode is an NR-DC mode.

In some embodiments of the method 1100, the MR-DC mode is an EN-DC mode.

Embodiments contemplated herein include an apparatus comprising means to perform one or more elements of the method 1200. This apparatus may be, for example, an apparatus of a UE 1300 as described below.

Embodiments contemplated herein include one or more non-transitory computer-readable media comprising instructions to cause an electronic device, upon execution of the instructions by one or more processors of the electronic device, to perform one or more elements of the method 1100. This non-transitory computer-readable media may be, for example, the memory 1306 of the UE 1300 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 1100. This apparatus may be, for example, an apparatus of a UE 1300 as described below.

Embodiments contemplated herein include an apparatus comprising: one or more processors and one or more computer-readable media comprising instructions that, when executed by the one or more processors, cause the one or more processors to perform one or more elements of the method 1100. This apparatus may be, for example, an apparatus of a UE 1300 as described below.

Embodiments contemplated herein include a signal as described in or related to one or more elements of the method 1100.

Embodiments contemplated herein include a computer program comprising instructions, wherein execution of the program by a processing element is to cause the processing element to carry out one or more elements of the method 1100. These instructions may be, for example, the instructions 1512 of the components 1500 as described below.

Figure 12:
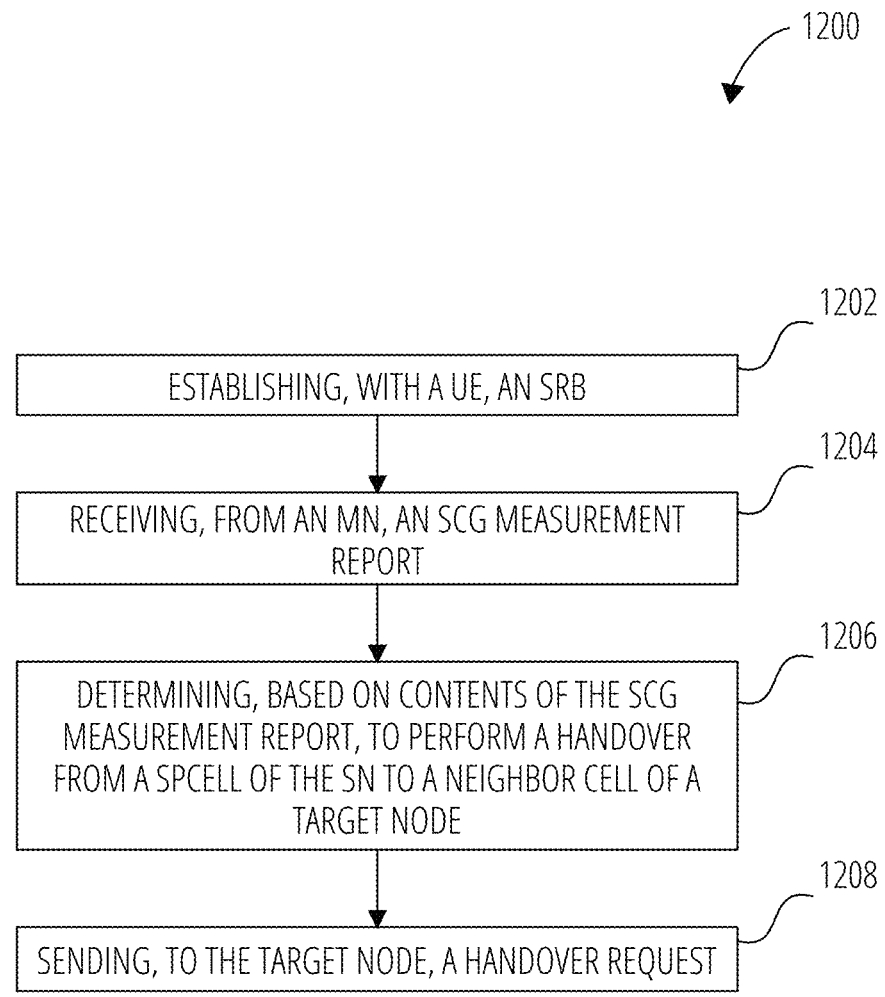
FIG. 12 illustrates a method of an SN operable with a UE using an MR-DC mode with an MN and the SN, according to an embodiment.

FIG. 12 illustrates a method 1200 of an SN operable with a UE using an MR-DC mode with an MN and the SN, according to an embodiment. The method 1200 includes establishing 1202, with the UE, an SRB.

The method 1200 further includes receiving 1204, from an MN, an SCG measurement report.

The method 1200 further includes determining 1206, based on contents of the SCG measurement report, to perform a handover from a SpCell of the SN to a neighbor cell of a target node.

The method 1200 further includes sending 1208, to the target node, a handover request. This may occur in the case where the SN is a different NR node than the target node, but may not occur in the case where the SN is the same NR node as the target node.

In some embodiments of the method 1200, the determining 1206, based on the contents of the SCG measurement report, to perform the handover comprises comparing a difference between a power level of the SpCell of the SN from the SCG measurement report and a power level of the neighbor cell of the target node from the SCG measurement report to a threshold amount.

In some embodiments of the method 1200, the SRB is an SRB3.

In some embodiments of the method 1200, the MR-DC is an NR-DC mode.

In some embodiments of the method 1200, the MR-DC mode is an EN-DC mode.

In some embodiments of the method 1200, the target node is the SN.

Embodiments contemplated herein include an apparatus comprising means to perform one or more elements of the method 1200. This apparatus may be, for example, an apparatus of a network node 1400 as described below.

Embodiments contemplated herein include one or more non-transitory computer-readable media comprising instructions to cause an electronic device, upon execution of the instructions by one or more processors of the electronic device, to perform one or more elements of the method 1200. This non-transitory computer-readable media may be, for example, the memory 1406 of the network node 1400 described below, and/or the peripheral devices 1504, the memory/storage devices 1514, and/or the databases 1520 of the components 1500 as described below.

Embodiments contemplated herein include an apparatus comprising logic, modules, or circuitry to perform one or more elements of the method 1200. This apparatus may be, for example, an apparatus of a network node 1400 as described below.

Embodiments contemplated herein include an apparatus comprising: one or more processors and one or more computer-readable media comprising instructions that, when executed by the one or more processors, cause the one or more processors to perform one or more elements of the method 1200. This apparatus may be, for example, an apparatus of a network node 1400 as described below.

Embodiments contemplated herein include a signal as described in or related to one or more elements of the method 1200.

Embodiments contemplated herein include a computer program comprising instructions, wherein execution of the program by a processing element is to cause the processing element to carry out one or more elements of the method 1200. These instructions may be, for example, the instructions 1512 of the components 1500 as described below.

Figure 13:
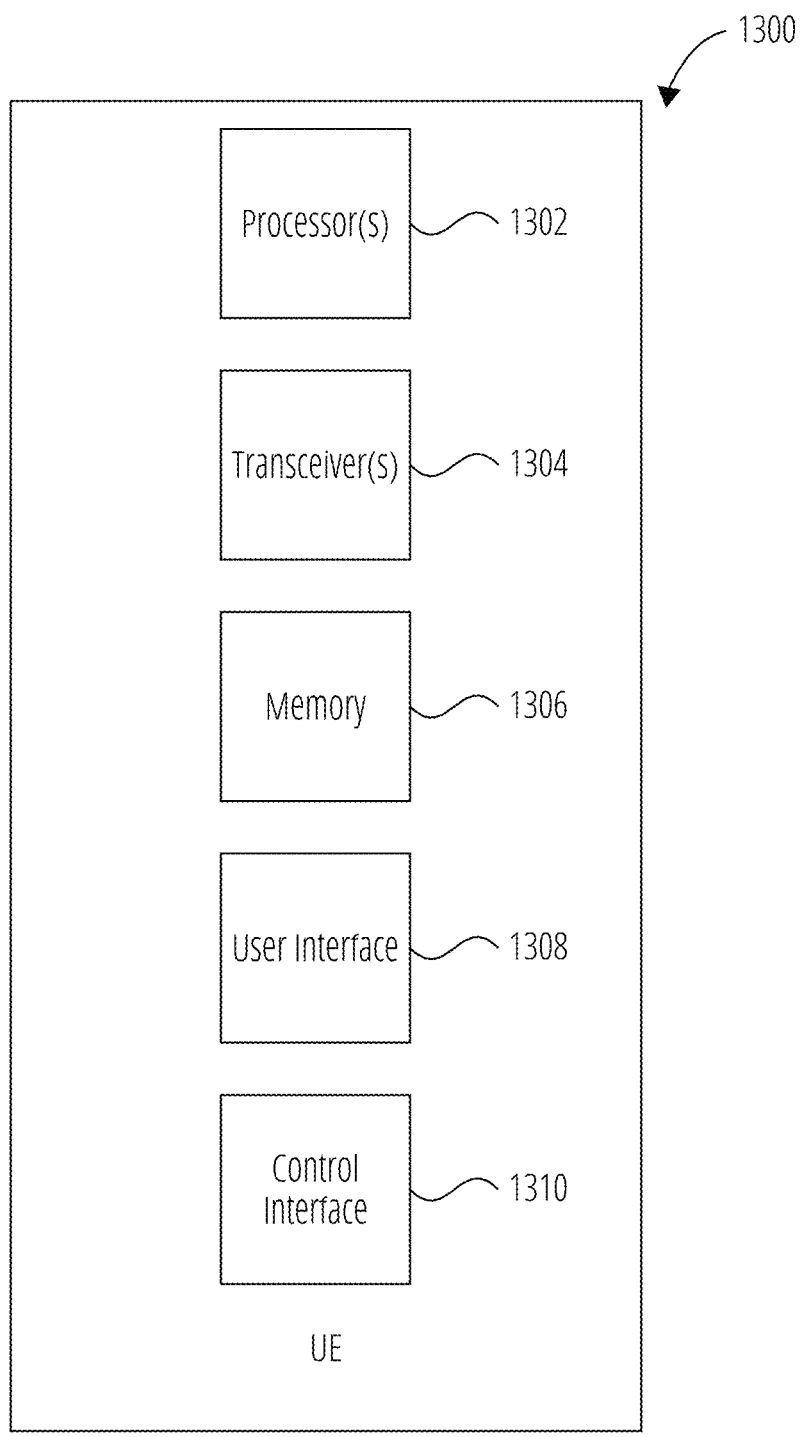
FIG. 13 illustrates a UE in accordance with one embodiment.

FIG. 13 is a block diagram of an example UE 1300 configurable according to various embodiments of the present disclosure, including by execution of instructions on a computer-readable medium that correspond to any of the example methods and/or procedures described herein. The UE 1300 comprises one or more processor 1302, transceiver 1304, memory 1306, user interface 1308, and control interface 1310.

The one or more processor 1302 may include, for example, an application processor, an audio digital signal processor, a central processing unit, and/or one or more baseband processors. Each of the one or more processor 1302 may include internal memory and/or may include interface(s) to communication with external memory (including the memory 1306). The internal or external memory can store software code, programs, and/or instructions for execution by the one or more processor 1302 to configure and/or facilitate the UE 1300 to perform various operations, including operations described herein. For example, execution of the instructions can configure the UE 1300 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 1304, user interface 1308, and/or control interface 1310. As another example, the one or more processor 1302 may execute program code stored in the memory 1306 or other memory that corresponds to MAC, RLC, PDCP, and RRC layer protocols standardized by 3GPP (e.g., for NR and/or LTE). As a further example, the processor 1302 may execute program code stored in the memory 1306 or other memory that, together with the one or more transceiver 1304, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 1306 may comprise memory area for the one or more processor 1302 to store variables used in protocols, configuration, control, and other functions of the UE 1300, including operations corresponding to, or comprising, any of the example methods and/or procedures described herein. Moreover, the memory 1306 may comprise non-volatile memory (e.g., flash memory), volatile memory (e.g., static or dynamic RAM), or a combination thereof. Furthermore, the memory 1306 may interface with a memory slot by which removable memory cards in one or more formats (e.g., SD Card, Memory Stick, Compact Flash, etc.) can be inserted and removed.

The one or more transceiver 1304 may include radio-frequency transmitter and/or receiver circuitry that facilitates the UE 1300 to communicate with other equipment supporting like wireless communication standards and/or protocols. For example, the one or more transceiver 1304 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 1302. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 1304 includes a transmitter and a receiver that enable the UE 1300 to communicate with various 5G/NR networks according to various protocols and/or methods proposed for standardization by 3GPP and/or other standards bodies. For example, such functionality can operate cooperatively with the one or more processor 1302 to implement a PHY layer based on OFDM, OFDMA, and/or SC-FDMA technologies, such as described herein with respect to other figures.

The user interface 1308 may take various forms depending on particular embodiments, or can be absent from the UE 1300. In some embodiments, the user interface 1308 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 may comprise a tablet computing device including a larger touchscreen display. In such embodiments, one or more of the mechanical features of the user interface 1308 may be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 1300 having a touch screen display are capable of receiving user inputs, such as inputs related to exemplary methods and/or procedures described herein or otherwise known to persons of ordinary skill in the art.

In some exemplary embodiments of the present disclosure, the UE 1300 may include an orientation sensor, which can be used in various ways by features and functions of the UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 1310 may take various forms depending on particular embodiments. For example, the control interface 1310 may include an RS-232 interface, an RS-485 interface, a USB interface, an HDMI interface, a Bluetooth interface, an IEEE ("Firewire") interface, an I2C interface, a PCMCIA interface, or the like. In some exemplary embodiments of the present disclosure, control interface 1260 can comprise an IEEE 802.3 Ethernet interface such as described above. In some embodiments of the present disclosure, the control interface 1310 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1300 may include more functionality than is shown in FIG. 13 including, for example, a video and/or still-image camera, microphone, media player and/or recorder, etc. Moreover, the one or more transceiver 1304 may include circuitry for communication using additional radio-frequency communication standards including Bluetooth, GPS, and/or others.

Moreover, the one or more processor 1302 may execute software code stored in the memory 1306 to control such additional functionality. For example, directional velocity and/or position estimates output from a GPS receiver can be available to any application program executing on the UE 1300, including various exemplary methods and/or computer-readable media according to various exemplary embodiments of the present disclosure.

Figure 14:
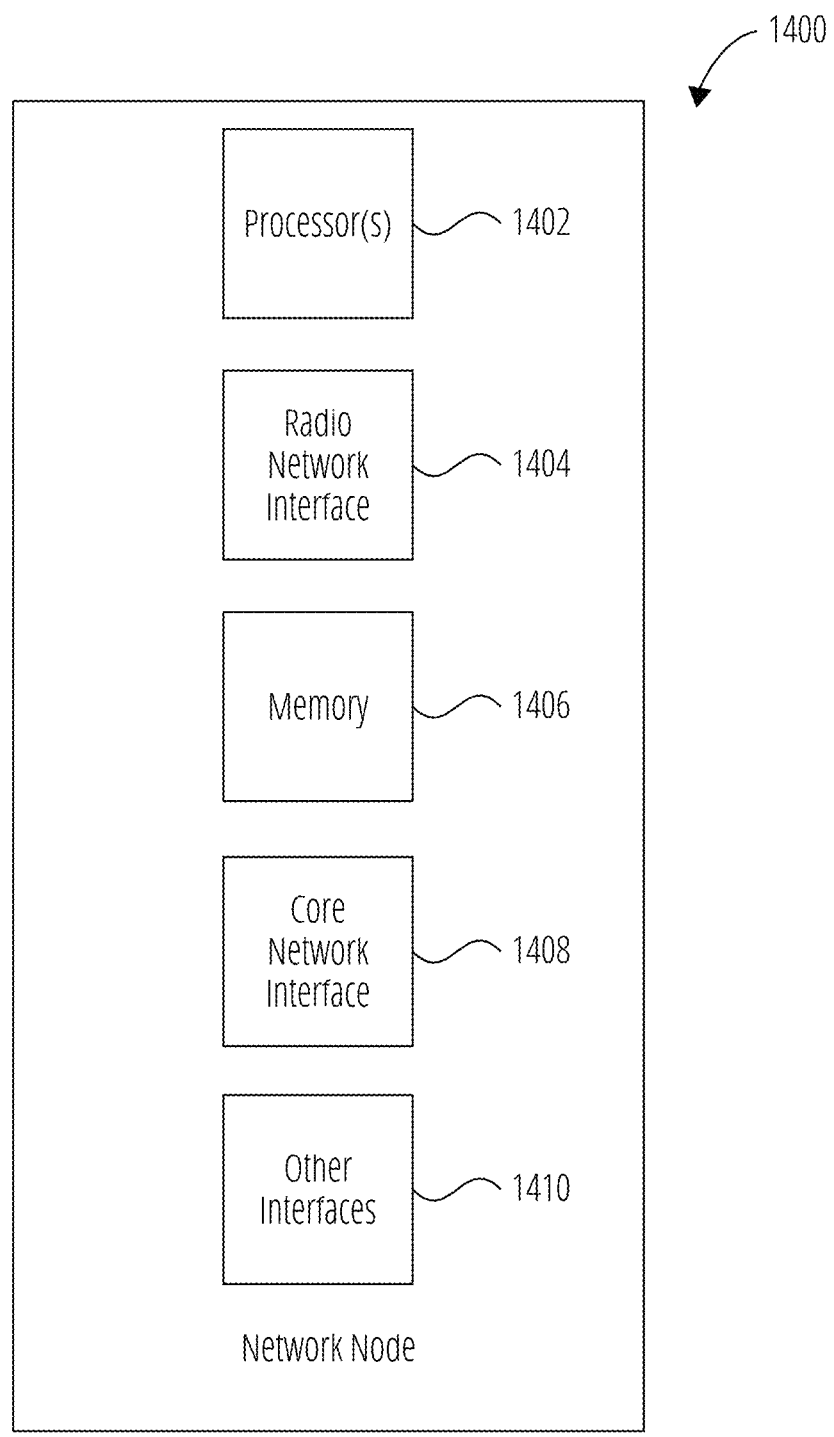
FIG. 14 illustrates a network node in accordance with one embodiment.

FIG. 14 is a block diagram of an example network node 1400 configurable according to various embodiments of the present disclosure, including by execution of instructions on a computer-readable medium that correspond to any of the example methods and/or procedures described herein.

The network node 1400 includes a one or more processor 1402, a radio network interface 1404, a memory 1406, a core network interface 1408, and other interfaces 1410. The network node 1400 may comprise, for example, a base station, eNB, gNB, access node, or component thereof. The network node 1400 may comprise an LTE node or an NR node, as those terms are used in this disclosure.

The one or more processor 1402 may include any type of processor or processing circuitry and may be configured to perform an of the methods or procedures disclosed herein. The memory 1406 may store software code, programs, and/or instructions executed by the one or more processor 1402 to configure the network node 1400 to perform various operations, including operations described herein. For example, execution of such stored instructions can configure the network node 1400 to communicate with one or more other devices using protocols according to various embodiments of the present disclosure, including one or more methods and/or procedures discussed above. Furthermore, execution of such stored instructions can also configure and/or facilitate the network node 1400 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1404 and the core network interface 1408. By way of example and without limitation, the core network interface 1408 comprise an S1 interface and the radio network interface 1404 may comprise a Uu interface, as standardized by 3GPP. The memory 1406 may also store variables used in protocols, configuration, control, and other functions of the network node 1400. As such, the memory 1406 may comprise non-volatile memory (e.g., flash memory, hard disk, etc.), volatile memory (e.g., static or dynamic RAM), network-based (e.g., "cloud") storage, or a combination thereof.

The radio network interface 1404 may include transmitters, receivers, signal processors, ASICs, antennas, beamforming units, and other circuitry that enables network node 1400 to communicate with other equipment such as, in some embodiments, a plurality of compatible user equipment (UE). In some embodiments, the network node 1400 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1404 may include a PHY layer based on OFDM, OFDMA, and/or SC-FDMA technologies. In some embodiments, the functionality of such a PHY layer can be provided cooperatively by the radio network interface 1404 and the one or more processor 1402.

The core network interface 1408 may include transmitters, receivers, and other circuitry that enables the network node 1400 to communicate with other equipment in a core network such as, in some embodiments, circuit-switched (CS) and/or packet-switched Core (PS) networks. In some embodiments, the core network interface 1408 may include the S1 interface standardized by 3GPP. In some embodiments, the core network interface 1408 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1408 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1410 may include transmitters, receivers, and other circuitry that enables the network node 1400 to communicate with external networks, computers, databases, and the like for purposes of operations, administration, and maintenance of the network node 1400 or other network equipment operably connected thereto.

Figure 15:
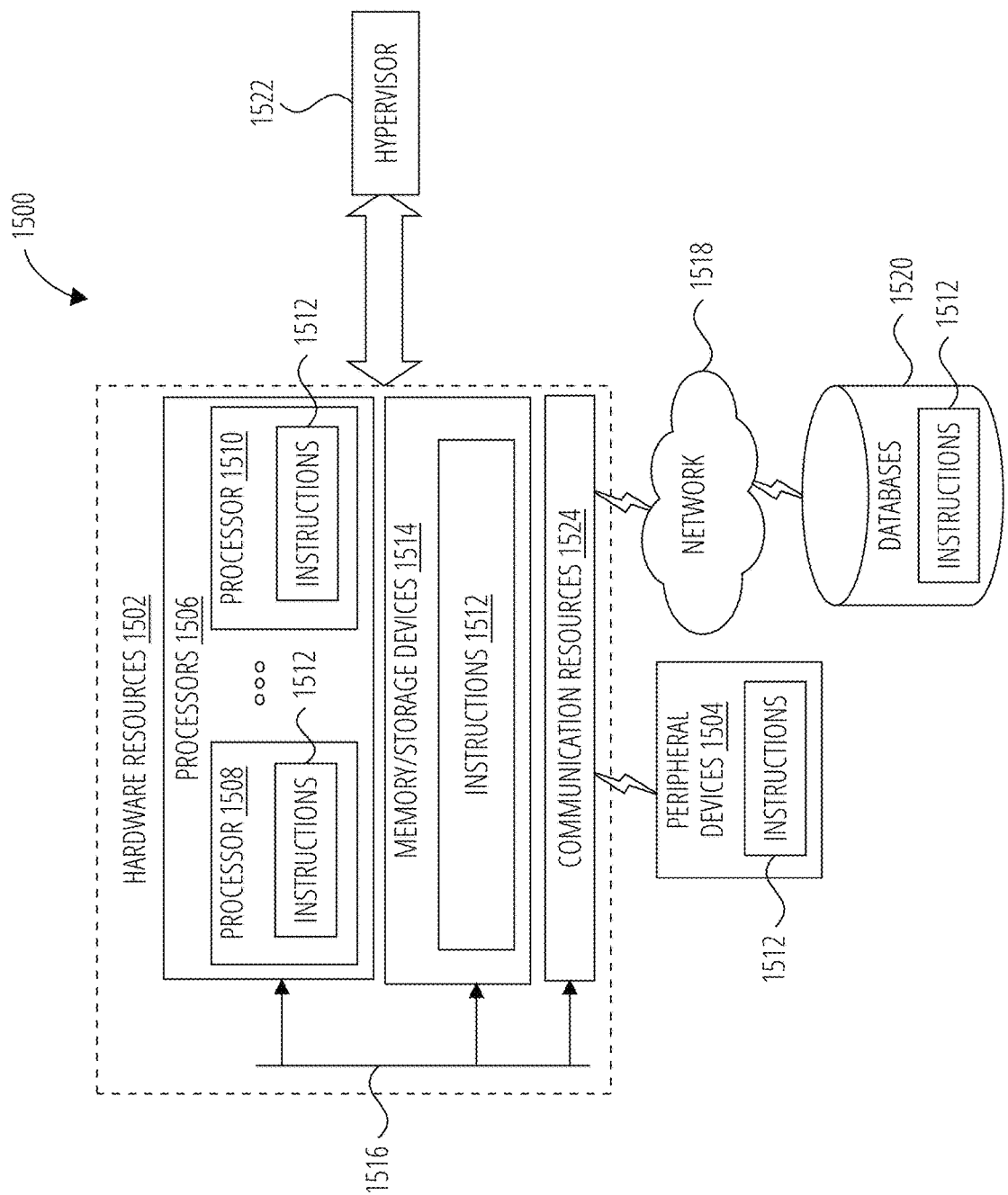
FIG. 15 illustrates components in accordance with one embodiment.

FIG. 15 is a block diagram illustrating components 1500, according to some example embodiments, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1502 including one or more processors 1506 (or processor cores), one or more memory/storage devices 1514, and one or more communication resources 1524, each of which may be communicatively coupled via a bus 1516. For embodiments where node virtualization (e.g., NFV) is utilized, a hypervisor 1522 may be executed to provide an execution environment for one or more network slices/sub-slices to utilize the hardware resources 1502. The components 1500 may be included in, for example, a UE or a network node as described herein.

The processors 1506 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1508 and a processor 1510.

The memory/storage devices 1514 may include main memory, disk storage, or any suitable combination thereof. The memory/storage devices 1514 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1524 may include interconnection or network interface components or other suitable devices to communicate with one or more peripheral devices 1504 or one or more databases 1520 via a network 1518. For example, the communication resources 1524 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1512 may comprise software, a program, an application, an applet, an app, or other executable code for causing at least any of the processors 1506 to perform any one or more of the methodologies discussed herein. The instructions 1512 may reside, completely or partially, within at least one of the processors 1506 (e.g., within the processor's cache memory), the memory/storage devices 1514, or any suitable combination thereof. Furthermore, any portion of the instructions 1512 may be transferred to the hardware resources 1502 from any combination of the peripheral devices 1504 or the databases 1520. Accordingly, the memory of the processors 1506, the memory/storage devices 1514, the peripheral devices 1504, and the databases 1520 are examples of computer-readable and machine-readable media.

For one or more embodiments, at least one of the components set forth in one or more of the preceding figures may be configured to perform one or more operations, techniques, processes, and/or methods as set forth herein. For example, the baseband circuitry as described above in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a user equipment (UE) operating in a multi-radio dual connectivity (MR-DC) mode with a master node (MN) and a secondary node (SN), comprising:
   identifying, prior to a radio link failure (RLF) of a special cell (SpCell) of a secondary cell group (SCG) of the SN, that a handover condition corresponding to a degradation of the SpCell of the SCG of the SN has been detected at the UE; and
   in response to identifying that the handover condition corresponding to the degradation of the SpCell has been detected at the UE:
      sending an SCG measurement report to the SN on a first signaling radio bearer (SRB); and
      repeating a transmission of the SCG measurement report to the MN on a second SRB before an instruction to perform a handover to a new SN is received at the UE; and
   performing the handover from the SN to the new SN in response to receiving the instruction.

2. The method of claim 1, wherein identifying that the handover condition corresponding to the degradation of the SpCell has been detected at the UE comprises identifying that a neighbor cell of a target node is better than the SpCell by a threshold amount.

3. The method of claim 1, wherein identifying that the handover condition corresponding to the degradation of the SpCell has been detected at the UE comprises identifying that one or more out-of-sync (OOS) indications have been received from a lower layer.

4. The method of claim 1, wherein identifying that the handover condition corresponding to the degradation of the SpCell has been detected at the UE comprises identifying that a T310 timer is running at the UE.

5. The method of claim 1, wherein the SCG measurement report that is sent to the MN on the second SRB is sent in a ULInformationTransferMRDC message.

6. The method of claim 1, wherein the first SRB is an SRB3 and the second SRB is an SRB1.

7. The method of claim 1, wherein the SCG of the SN comprises a plurality of cells including the SpCell.

8. The method of claim 1, wherein the MR-DC mode is a new radio (NR)-NR dual connectivity (NR-DC) mode.

9. The method of claim 1, wherein the MR-DC mode is an evolved universal terrestrial radio access (E-UTRA)-new radio (NR) dual connectivity (EN-DC) mode.

10. A baseband processor configured to operate an apparatus in a multi-radio dual connectivity (MR-DC) mode with a master node (MN) and a secondary node (SN) by causing the apparatus to:
   identify, prior to a radio link failure (RLF) of a special cell (SpCell) of a secondary cell group (SCG) of the SN, that a handover condition corresponding to a degradation of the SpCell of the SCG of the SN has been detected; and in response to identifying that the handover condition corresponding to the degradation of the SpCell has been detected:
  send an SCG measurement report to the SN on a first signaling radio bearer (SRB); and
  repeat a transmission of the SCG measurement report to the MN on a second SRB before an instruction to perform a handover to a new SN is received; and
perform the handover from the SN to the new SN in response to receiving the instruction.

11. The baseband processor of claim 10, wherein identifying that the handover condition corresponding to the degradation of the SpCell has been detected comprises identifying that a neighbor cell of a target node is better than the SpCell by a threshold amount.

12. The baseband processor of claim 10, wherein identifying that the handover condition corresponding to the degradation of the SpCell has been detected comprises identifying that one or more out-of-sync (OOS) indications have been received from a lower layer.

13. The baseband processor of claim 10, wherein identifying that the handover condition corresponding to the degradation of the SpCell has been detected comprises identifying that a T310 timer is running.

14. The baseband processor of claim 10, wherein the SCG measurement report that is sent to the MN on the second SRB is sent in a ULInformationTransferMRDC message.

15. The baseband processor of claim 10, wherein the first SRB is an SRB3 and the second SRB is an SRB1.

16. The baseband processor of claim 10, wherein the SCG of the SN comprises a plurality of cells including the SpCell.

17. The baseband processor of claim 10, wherein the MR-DC mode is a new radio (NR)-NR dual connectivity (NR-DC) mode.

18. The baseband processor of claim 10, wherein the MR-DC mode is an evolved universal terrestrial radio access (E-UTRA)-new radio (NR) dual connectivity (EN-DC) mode.

19. An apparatus for operating in a multi-radio dual connectivity (MR-DC) mode with a master node (MN) and a secondary node (SN), comprising:
  one or more processors; and
  memory storing instructions that, when executed by the one or more processors, configure the apparatus to:
    identify, prior to a radio link failure (RLF) of a special cell (SpCell) of a secondary cell group (SCG) of the SN, that a handover condition corresponding to a degradation of the SpCell of the SCG of the SN has been detected;
    in response to identifying that the handover condition corresponding to the degradation of the SpCell has been detected:
      send an SCG measurement report to the SN on a first signaling radio bearer (SRB); and
      repeat a transmission of the SCG measurement report to the MN on a second SRB before an instruction to perform a handover to a new SN is received; and
    perform the handover from the SN to the new SN in response to receiving the instruction.

20. The apparatus of claim 19, wherein identifying that the handover condition corresponding to the degradation of the SpCell has been detected comprises identifying that a neighbor cell of a target node is better than the SpCell by a threshold amount.

* * * * *